(12) United States Patent
Venkatakrishnan et al.

(10) Patent No.: US 11,526,568 B2
(45) Date of Patent: Dec. 13, 2022

(54) USER INTERFACES AND METHODS FOR OPERATING A MOBILE COMPUTING DEVICE FOR LOCATION-BASED TRANSACTIONS

(71) Applicant: Yellcast, Inc., San Carlos, CA (US)

(72) Inventors: Ganesan Venkatakrishnan, San Carlos, CA (US); William Foster, Santa Fe, NM (US); Peter Ellenby, Portland, OR (US); Thomas William Ellenby, San Jose, CA (US)

(73) Assignee: YellCast, Inc., San Carlos, CA (US)

( * ) Notice: Subject to any disclaimer, the term of this patent is extended or adjusted under 35 U.S.C. 154(b) by 0 days.

(21) Appl. No.: 16/422,880

(22) Filed: May 24, 2019

(65) Prior Publication Data

US 2019/0361950 A1    Nov. 28, 2019

Related U.S. Application Data

(60) Provisional application No. 62/676,710, filed on May 25, 2018.

(51) Int. Cl.
| | | |
|---|---|---|
| *G06F 3/048* | (2013.01) | |
| *G06F 16/9537* | (2019.01) | |
| *G06F 3/01* | (2006.01) | |
| *H04W 4/021* | (2018.01) | |
| *G06F 16/9538* | (2019.01) | |
| *G06F 9/451* | (2018.01) | |

(Continued)

(52) U.S. Cl.
CPC ......... *G06F 16/9537* (2019.01); *G06F 3/017* (2013.01); *G06F 9/451* (2018.02); *G06F 16/2379* (2019.01); *G06F 16/29* (2019.01); *G06F 16/9538* (2019.01); *H04W 4/021* (2013.01)

(58) Field of Classification Search
None
See application file for complete search history.

(56) References Cited

U.S. PATENT DOCUMENTS

| | | | | |
|---|---|---|---|---|
| 2007/0288196 A1* | 12/2007 | Frank | ................... | G01S 5/0252 |
| | | | | 702/151 |
| 2009/0319181 A1* | 12/2009 | Khosravy | ............. | G06F 1/1694 |
| | | | | 701/532 |

(Continued)

*Primary Examiner* — William C Trapanese
(74) *Attorney, Agent, or Firm* — Haynes and Boone, LLP

(57) ABSTRACT

A method including monitoring an amount of angular motion of an electronic device for a movement (e.g., casting motion) of the electronic device and determining that the amount of angular motion for the movement exceeds a threshold. A geographic location and a pointing direction of the electronic device may be determined for the movement. A geographic region may be determined based at least in part on the geographic location and the pointing direction of the electronic device. In some implementations, the geographic region may be determined based on the amount of angular motion for the movement. The geographic region may be used as part of a search query. Places of interest corresponding to the geographic region may be determined and provided for display and selection via a user interface of the electronic device. Selectable transactions for the geographic region may also obtained and presented by the electronic device.

20 Claims, 13 Drawing Sheets

(51) Int. Cl.
  *G06F 16/23* (2019.01)
  *G06F 16/29* (2019.01)

(56) References Cited

U.S. PATENT DOCUMENTS

| | | | | |
|---|---|---|---|---|
| 2011/0032145 A1* | 2/2011 | Hansen | ............... | G01S 5/0063 |
| | | | | 342/357.34 |
| 2011/0098029 A1* | 4/2011 | Rhoads | ............. | G06K 9/00993 |
| | | | | 455/418 |
| 2015/0347603 A1* | 12/2015 | Jhunjhnuwala | ....... | G06F 16/137 |
| | | | | 707/734 |
| 2017/0337563 A1* | 11/2017 | Chen | ..................... | G06Q 20/20 |

* cited by examiner

USER INTERFACES AND METHODS FOR OPERATING A MOBILE COMPUTING DEVICE FOR LOCATION-BASED TRANSACTIONS

FIELD OF THE INVENTION

The present disclosure generally relates to mobile computing. The disclosure relates more particularly to apparatus and techniques for performing searches, effecting transactions and interactions from a device using determined device location and/or pointing direction data derived from the device.

CROSS-REFERENCES TO PRIORITY AND RELATED APPLICATIONS

This application claims priority from and is a non-provisional of U.S. Provisional Patent Application No. 62/676, 710 filed May 25, 2018, entitled "User Interface for Operating a Mobile Computing Device for Location-Based Transactions." The entire disclosure of the application recited above is hereby incorporated by reference, as if set forth in full in this document, for all purposes.

BACKGROUND

Many mobile computing devices have processors, displays, communication capabilities, input sensors, and programming and/or sensors that allow the mobile computing devices to determine their geographic location. It would be useful to be able to use those mobile computing devices in facilitating searches and transactions of various types.

SUMMARY

The following detailed description together with the accompanying drawings will provide a better understanding of the nature and advantages of the present disclosure.

A mobile computing device oriented at a point-of-transaction location may be detected. A gesture made with the mobile computing device directed at the point-of-transaction location may be detected. A geographic location of the mobile computing device may be determined. A remote database may be communicated with to identify possible transactions in the remote database that are associated with the point-of-transaction location based on the geographic location of the mobile computing device, retrieving transaction details of the possible transactions. At least one presented transaction of the possible transactions may be presented on a display. An input related to the presented transaction may be received.

The gesture may be a shaking or rotation of the mobile computing device. An interface may be presented for presenting user options and receiving a selection of an option from a user.

A computer application identifies a triangle, where the triangle is defined at least in part by a current geographic location of the portable device a current compass orientation of the portable device, and a distance. The computer application initiates a search, at least in part by providing a search query comprising a search string, a search target geographic location, and a search radius, and initiates a search, at least in part by providing a search query comprising a search string, a search target geographic location, and a search radius. In addition, the computer program obtains a plurality of results for the search. The individual results relate to the search string and include a geographic identifier that associate the respective result with a geographic location within a circle of the search radius around the search target geographic location. The computer program filters the returned results to remove the results that have associated geographic locations within the circle but outside of the triangle.

The distance of the triangle may be defined according to a movement experienced by the portable device. The movement experienced may be an acceleration in a sweeping motion, such that faster sweeping corresponds to larger distance. The movement may be a casting-type movement. The triggering of the search may be defined according to a movement experienced by the portable device. Triggering of the search and the movement used to define the distance may be the same movement. The movement may be a casting-type movement. The triangle may be an isosceles triangle having a base angle and two equal angles, a base vertex, a base side opposite the base angle and two legs opposite the equal angles, with a base vertex location being a function of a current geographic location of the portable device and a direction from the base vertex to the base side is determined from a current compass orientation of the portable device. The base vertex location may be a predetermined distance in a direction opposite the current compass orientation. The predetermined distance may vary based at least in part on at least one of a determined density of search results or a population at a current geographic location of the portable device. A distance from the base vertex to the base side may be determined from a magnitude of a movement experienced by the portable device. The triangle may be further defined at least in part by a scale, wherein the scale is defined according to a magnitude of a movement experienced by the portable device.

In another implementation, instructions, when executed by a computer system, may cause the computer system to monitor an amount of angular motion of an electronic device for a movement of the electronic device, determine that the amount of angular motion exceeds a threshold, determine a pointing direction of the electronic device for the movement, determine a geographic location of the electronic device for the movement, and determine information indicative of a geographic region that corresponds to the movement of the electronic device. The information indicative of the geographic region is defined at least in part by the pointing direction and the geographic location.

The instructions may further cause the computer system to cause the information indicative of the geographic region to be sent to a remote server, obtain a plurality of results, and cause the plurality of results to be presented by the electronic device.

The information indicative of the geographic region may further be determined based at least in part by a rate of angular motion in a vertical plane of the movement. The pointing direction of the electronic device for the movement may be determined based at least in part on a first compass bearing value of the electronic device at a first position in the horizontal plane of the movement, and a second compass bearing value of the electronic device at a second position in the horizontal plane of the movement. The dimensions of the geographic region may be determined based at least in part on the amount of angular motion, first compass bearing value of the electronic device at a first position in the horizontal plane of the movement, and a second compass bearing value of the electronic device at a second position in the horizontal plane of the movement.

BRIEF DESCRIPTION OF THE DRAWINGS

Various embodiments in accordance with the present disclosure will be described with reference to the drawings, in which.

DETAILED DESCRIPTION

Figure 1:
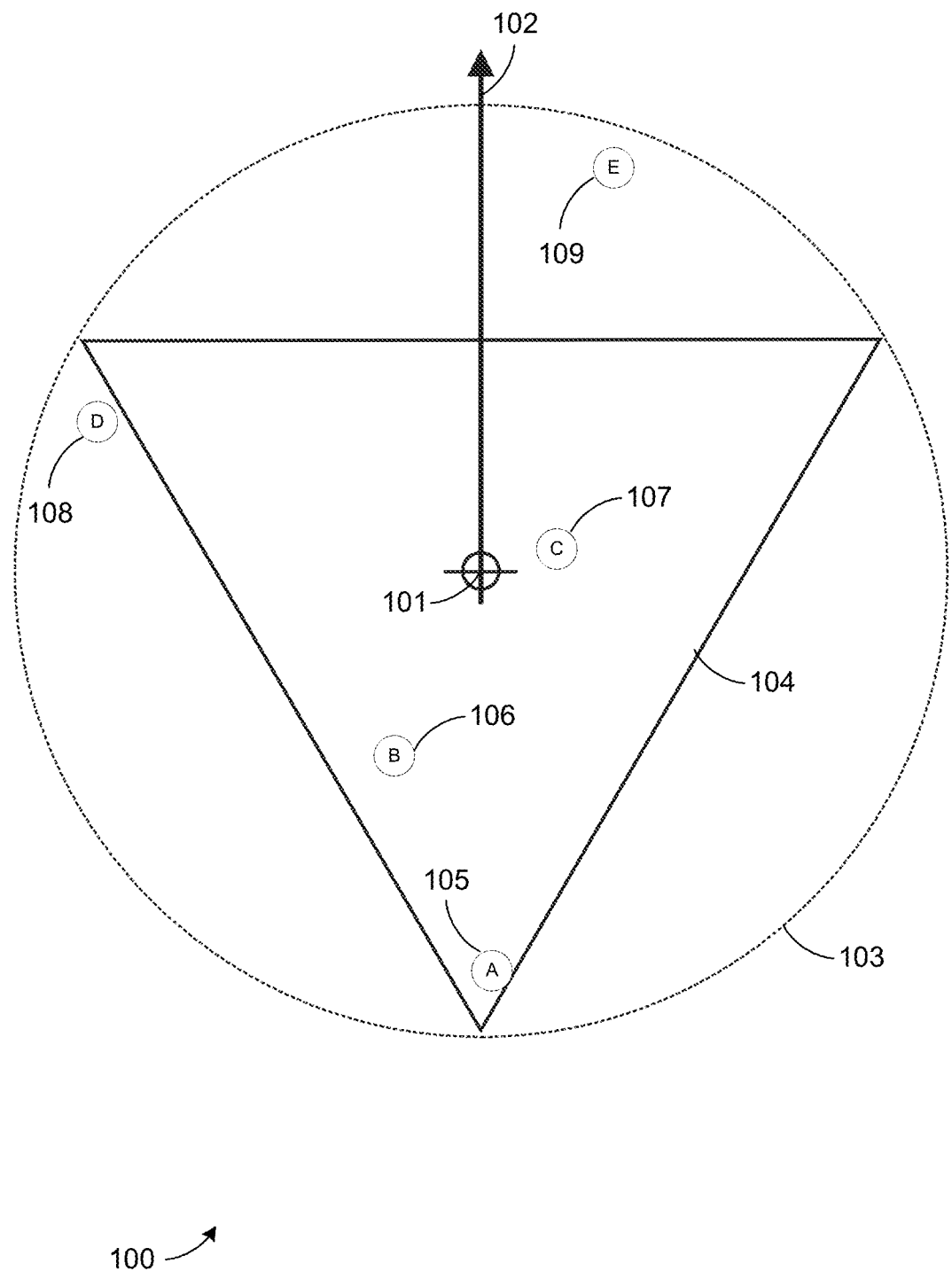
FIG. 1 is an illustration in plan view of a possible mode of operation of the geographical search system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein may involve converting a geographic location, gesture or movement, and orientation of an electronic device into a geographic region, obtaining search results for places of interest (POIs) corresponding to the geographic region, and facilitating transactions using an electronic device without requiring that point-of-transaction equipment be present.

An electronic device may include a mobile computing device, mobile phone, smartphone, tablet, or wearable computing device, such as a smart watch, smart glasses, embedded computer systems, or other devices, etc. Unless otherwise indicated, an electronic device can include multiple devices.

An electronic device may be capable of wireless communication via a network to communicate, for example, with one or more other electronic devices. For example, an electronic device may include a watch and a desktop computer that are communicatively coupled with one another. In an example, the electronic device includes a vehicle. In another example, an electronic device may include a watch and an automobile. The network can be the Internet, an intranet, an extranet, a LAN, WAN or similar network that connects the electronic device to at least another device or some network services. The network services may include a host system, such as the host system discussed below in connection with FIG. 7.

An electronic device may include sensors that are capable of sensing movements or gestures of the electronic device. For example, an electronic device may include one or more accelerometers, transducers, gyroscopes, or other sensors. Data output by such sensors may be usable to determine linear acceleration, rotational velocity, rotational acceleration, etc. of the electronic device during gestures or movements.

An electronic device may include technology that is usable to determine a geographic location of the electronic device. For example, an electronic device may include technology such as a global positioning system ("GPS"), an augmented or assisted GPS ("AGPS"), an indoor positioning system ("IPS"), an altimeter, and/or other, technology usable to determine an electronic device's geographic location. An electronic device may include local wireless technologies or device sensors that can be used to obtain or increase the accuracy of the geolocation and the heading angle. For example, an electronic device may be integrated with existing Bluetooth and NFC systems to displace the NFC hardware and systems in place to save on installation and maintenance of NFC electronics and equipment.

As used herein, the "geographic location" of an electronic device refers to a position of the electronic device with respect to the earth or other point of reference. Geographic location of an electronic device may be represented by latitude and longitude values or a coordinate system. Geographic location may be determined based on data from a GPS unit of an electronic device. In some implementations, other information may be included, such as an indication of altitude, e.g., as a particular floor in a building or a distance above sea level or other point of reference. For example, geographic location may be represented by an altitude value or symbol to indicate, for example, a particular floor of a skyscraper where the electronic device is located. In some implementations, geographic location may be indicated using a map or other coordinate system. For example, if the electronic device is positioned in a large hospital, the geographic location of an electronic device may be a floor and room in the hospital where the device is located.

An electronic device may include technology, such as a compass, for determining pointing direction or compass bearing of the electronic device. The pointing direction may be determined for a gesture or movement, or in response to an input to an electronic device. For example, a pointing direction may be determined at a beginning and/or end of a gesture or movement. In some implementations, a pointing direction may be determined at the end of a cast and may correspond to where the device is being pointed at the cast.

For the sake of readability, explanations are provided in the context of an electronic device running an "app" that interacts over the network with a computer system where the app and computer system are coordinated such that the way the app interacts with the computer system is at least familiar to the computer system and vice versa. Unless otherwise indicated, the app can be a program executed by one or more processors and running on the electronic device in user space, system space, in browser space, etc. and can be a simple or complex program with a general or specific purpose. Thus, the "app" designation herein is not, unless otherwise indicated, limited to specific types of programs. The app may include a user interface.

POIs may be returned as results or hits of a cast search or pointing search. POIs may be geo-located objects. The POIs may be real, such as a restaurant or an ATM, or virtual, such as an object in a game or a virtual billboard. POIs may be people or animals. An amount of POIs returned for a search may be determined based on search parameters, specified by the user in settings, or based on one or more characteristics of a movement or gesture of the electronic device. The POIs returned may depend on user preferences and/or a defined geographic region associated with the cast. A search distance may be determined based on the number of results, specified by the user in settings, or based on one or more characteristics of a motion experienced by the electronic device.

POIs may have associated information, such as phone numbers, email addresses, website address, media files, etc. As an example, a POI that is a restaurant may be associated with a telephone number, email address, or online menu for the restaurant. If a POI is selected by a user of the electronic device, the associated information may be provided to the electronic device for display. In some implementations, POIs may include or be associated with transactions, such as theater tickets, food or clothing items available for purchase. POI transactions may be associated with a geographic location of the provider (e.g., physical location of theater or restaurant) or other locations, such as a billboard associated with the provider. In one or more implementations, POI information such as images or customer reviews may be provided by users.

Examples of embodiments include an electronic device (e.g., smartphone) that is programmed with an app to perform the operations described herein.

In one or more implementations, an electronic device may make local geographic searches that are initiated by and based upon a physical gesture of an electronic device. Such searches are referred to herein as "pointing searches," "casting searches," and "gesture searches." Using the compass and accelerometers, or other sensors that record the spatial situation of the electronic device one can define a geographic region, and/or initiate a local geographic search or query by making a casting motion, much like a motion of casting a fishing rod.

A "cast" or "casting" an electronic device refers to a physical gesture of a electronic device that may define a geographic region or area. A geographic region defined by a cast may be determined using the electronic device's sensors for determining the electronic device's spatial state and motion (e.g., accelerometer, gyroscope, etc.), combined with that device's geographic location as determined, for example, by the device's geographic positioning sensors (e.g., GPS, AGPS, IPS, altimeter or other position sensing technology), and the electronic device's pointing direction (e.g., compass bearing) as determined, for example, by the electronic device's compass. In some implementations, the cast may automatically result in a query being made with respect to a defined geographic area of the cast.

As described herein, the electronic device can be used for presenting on a user interface localized information in response to a user request for information and a reading of location data. The user interface might be provided by a mobile device app that the user of the electronic device preloads on their device and calls up on demand. For example, when executing the app, the app may present a user interface. In some implementations, a cast may cause a user interface or an app to be initiated or triggered on an electronic device.

One such user interface may be described thusly. A portion of a map is displayed. Displaying map data as an image is known and conventional sources of map data might be accessed. An indication of device position, for example a "pin" or other image or icon, may be shown overlaid on the map data to represent the electronic device's current location, as might be determined by location determining functions of the electronic device. A circle or other shape may also be overlaid, where the circle may be centered on the pin location and have a radius that can be specified by the app and/or altered by the user via a user interface, such as a "settings" menu or taken from context such as how fast the electronic device is moving and/or a distance or direction of a movement of the electronic device, such as discussed below in connection with FIG. 12.

A triangle may also be overlaid, where the triangle forms a "beam" that spreads out from a triangle origin location behind the user, where "behind" might be determined from the compass orientation of an electronic device at the time a search request is made. The "origin" of the triangular beam might be a specified distance (e.g., 10-20 feet) behind the user, so as to include nearby locations that might be slightly behind the user. The length of the triangle (e.g., the distance from the triangle origin location to the furthest edge of the triangle) might be set by a settings parameter or a context. Similarly, the width of the beam might be set by a settings parameter or a context. The triangle forms a region of interest around the user's current location. As the user rotates their device, the triangle may also rotate and thus the region of interest presented by the user interface may change.

The user interface input to initiate a search yields a region (the search region or region of interest) and that region may be used to filter search results. The region may be positioned relative to an actual geographic location.

Using some user interface input the user directs the app to begin a search and to use the region of interest in the search process. The user might direct the app to begin a search by pressing a button, or perhaps by "casting" an electronic device in a direction of interest. Casting might involve the user simply swinging their device in their hand from a high point to a low point or vice versa as someone might do when casting with a fishing rod. An electronic device can then sense this gesture using sensors or other methods. Casting may trigger a search automatically. For example, a casting gesture may trigger the app to initiate a search. Casting is described more fully below.

However initiated, the app initiates a search for businesses, people, entities and the like that are known to have locations with the region of interest. In this manner, a person might walk around an urban area, orient towards a number of shops of interest, cast their phone, for example, and receive a listing of the businesses that are located within the region of interest that the app defined.

In some cases, the pin representing the electronic device's (and the user's) location might be adjusted to take into account movement of the user and the electronic device from one geographic location to another geographic location. For example, if the user is traveling in a fast train, the pin might be moved to an anticipated location of the user 60 seconds in the future (i.e., "located in the projected path"). Such movement of the user and the electronic device may be detected using technology (e.g., accelerometer, GPS, etc.) of the electronic device. For example, the rate and route of travel may be determined and the expected geographic location at a future time determined using the rate and route of travel. For example, an electronic device may be determined to be traveling along a known highway at 60 miles per hour based, and the expected location of the electronic device may be determined using the speed and path of the electronic device.

In some implementations, determining a geographic location and a pointing direction of an electronic device, can be used to identify a vicinity of a projected path. The pointing direction may be determined using a compass of an electronic device. A database query could be limited by locations specified by that path. The search results may be selected based upon if it falls within a sector, narrow rectangle or polygon along the pointed direction. In some variations, the location might be adjusted, such as moving the deemed location for path generation purposes to a point corresponding to several feet behind the user's device Alternatively, instead of triangles, a rectangle along the direction of where the user is pointing might be used, or a polygon that extends from where the user is located, towards the pointing direction, where the pointing direction might be indicated by a compass sensor. The search results would represent search hits that have locations in the vicinity of the projected path or within the region of interest.

The distance of projection, size of path, etc. might vary depending upon what the user is looking for. Near projections might be used in small streets in small town like locations (e.g., approximately 300 feet wide), medium projections might be used in broader roads in larger cities (e.g., approximately 500 feet wide) and far projections might be used in a highway environment (e.g., approximately 1000 feet wide). Another method may be to iteratively increase the distance in steps, until meaningful data is available. In one or more implementations, the distance of projection may be determined automatically based on the determined geographic location. For example, if the geographic location of an electronic device is determined to be a high density (e.g., population, POI, etc.) area, then the distance of projection may be determined from a table to be 300 feet. If the geographic location of an electronic device is determined to be a low density area, then the distance of projection may automatically be determined from a table to be 600 feet. In one or more implementations, a distance of projection, size of path, etc. may be determined based on a characteristic of an electronic device or network being used to perform a search. For example, a distance of projection, size of path, etc. may be determined based at least in part on a resolution or size of a display used to present results or a bandwidth of a network over which the results are sent.

In one or more implementations, search results may be obtained from databases. Databases might be custom or third-party databases and might provide for access via APIs. Different sources of data from third parties may provide results differently. Information from real-world sources can be identified by pointing at and matching the results within the geo-proximity in the pointed direction.

Search results, such as business details, that can be found in the real world can be identified by pointing at and matching the results within the geo-proximity in the pointed direction, perhaps using geocoded data available from third party or local databases. The information may include photos, video, text description, reviews, coupons and buttons to contact using text, phone, web form, or other instant messaging applications.

The searches are performed over a database that might be from remote third parties with location data is accessed through APIs. The app can access multiple sources of data then sort, aggregate, consolidate and present that data to the user. Different sources of data from third parties may provide results differently and some of them work better over the others.

Implementations described herein may be utilized in a variety of applications and may provide an interactive content experience. Users may point at any real-world business POIs such as a restaurant or movie theatre for example. Then they can view the menu, or listed movies. They can look at individual items such as organic/non-GMO, vegan dishes or the cast and reviews. They can place an order on the items. They can pay for the purchase with their identity and saved payment information. Then further they can review what they purchased. The reviews generated thereby can be limited only to people who purchased and used the product/service or actually had the user experience.

Pointing or casting may be utilized for a user to provide information updates for places or objects using an electronic device. Users may click/cast to submit their own information about a place. For example, a user may point or perform a cast search and select a result that corresponds to a POI. The user may provide photos, videos, text description, reviews, ratings and other sharable useful information for the selected POI.

Pointing or casting may be utilized to obtain information about object POIs As an example, a historic building that is matched in geo-proximity in the pointed direction may appear in a short list and when clicked/casted at can provide information about the building and/or organizations that occupy the building, e.g., businesses, schools, services, attractions, etc. The users can also send information related to an object, like signing a visitor/viewer log for an object, once connected. For example, a user may obtain information about a geographic location where the user is positioned by pointing the electronic device vertically up or down. Users may send symbols that may identify the user such as names to sign a guest book or contact information to receive additional information about the object or to make a purchase related to the object.

Pointing or casting may be used for educational and entertainment applications. For example, kids can point, click/cast and browse around, as they are driving with their family for example in the real world, thus learning while still using interactive smartphones rather than playing video games, watching videos or movies. The educational applications may be adapted to more interactive pointing and clicking/casting learning experience in the real world. In an example, a user points or casts an object (e.g., landmark such as El Capitan) and then is prompted to identify the object. If the user correctly identifies the object, a score for the user may be increased. Users can compete with one another for entertainment and share experiences while physically apart from each other. For example, a user may cast/point a POI, and the POI and/or related information (e.g., an image of the POI) is then provided to users of a group for identification by individual members of the group. Users may enter their answers regarding identification of the POI into an app and their scores may be tracked.

Pointing or casting may be used for real estate viewing and transactions Driving or walking around, users can point, click/cast and view information such as details, photos and videos of a place and its area for any pointed property. For example, a user browsing neighborhoods to make a home purchase may cast a geographic region of a house to obtain a home value estimate for the house. In another example, a user may cast/point a neighborhood to obtain statistics about the neighborhood, such as schools, community events, etc. In another example, users may point/cast a home that is for sale and then obtain contact information for a party that is selling the home to arrange a tour or submit an offer.

Pointing or casting may be used to obtain information about POIs that are moving objects. In an example a car race or horse race, a location of each car/horse or the racer may be tracked using a GPS or radio frequency identification (RFID) tag and array of readers or other location sensor that may be used to track their geolocation dynamically and the geolocations are provided to a system or server. A user pointing in the proximity and direction of that tagged car can push a button to select from the matched shortlist and get available data about the car or send data to the car.

In another example, in a hospital a patient in the bed can click/cast and view information about the visiting doctor by pointing and clicking/casting at them. In an example of such an implementation, an IPS may be used to determine the geographic location of the electronic device and doctors. Users can cast or point to select POIs, such as doctors or hospital departments.

Pointing or casting may be used to facilitate messaging among users. For example, search result data may contain clickable phone numbers to call a regular phone line (land/mobile) associated with the object. In an implementation, there may be clickable links presented to email or text message to mobile phones or message through messaging apps. Thus, two people using the app can connect by one person locating their device in a location, orienting it in a direction (thus defining a region from the location, the orientation, and possibly also a range) and then shaking or casting the electronic device in that direction, thus triggering an electronic device to initiate a search of the databases for hits within that region. Where there are other users in that region, a list of those other users can be presented to the searcher. That list can be used to contact one or more people who are currently within the region.

Pointing or casting may be used to facilitate interpersonal communication and networking. For example, two or more users that meet in the real world can point at each other using their smartphone or smartwatch, match the other person in geo-proximity found from casting or pointing and push a button to add them as a friend or associate to their social or business network. The users may also exchange their electronic contact data records for example in a business-like application.

In one or more implementations, two or more users can find each other in real life in proximity point in the pointed direction with their smartphone or smartwatch and select the matched user to connect with. Both users' locations can be dynamically tracked as they move and the heading can also change. Once the users are connected, they can be identified through a point-and-chat database and can talk/text/voice/video chat without sharing their actual contact information with a central system being an intermediary. This concept enables connecting instantly and communicating between users with absolute anonymity, without the need for exchanging actual contact information such as phone numbers, email IDs or messaging IDs.

A connection between the users can also be maintained through the point-and-chat application even after the users have moved away from the geolocation where they actually connected. The connection can be broken if either user decides to disconnect from the other. Once this disconnect happens, unless both the users want to reconnect, they are kept disconnected and cannot communicate with each other.

Casting or pointing may be used in one or more social network implementations. As an example, suppose that multiple people have set their accounts with an intermediary service to be open to invites for private virtual connections for dating or friendship. The intermediary service would then maintain accounts for these people, as well as record location information of those people's devices as might be provided by those devices as set up by the electronic devices' owners. A first person standing at a train station having previously subscribed to the intermediary service might spot a second person inside a train that just stopped temporarily. The first person can point their smartphone towards the second person, click or gesture to initiate a search, and the intermediary service could return a search result related to that second person, if that second person is also a subscriber, and the first person can initiate a contact with the second person even before the train leaves. Then, though the train moved away, the two can continue to reach each other and connect. The second person might not want to engage and can accept or decline the request or have turned off all or part of that feature. The persons can communicate without actually exchanging any permanent contact information such as phone numbers, emails or chat IDs. At any point in time, they can disconnect or reconnect with privacy and security of not being further contacted, unless they want to, by so indicating to the intermediary service that connects to the database. Two users driving in their cars next to each other may be able to now discover, connect, say hello and share their experiences, without exchanging their actual contact information.

Steps of an example method that utilizes pointing or casting described herein to effectuate a transaction is as follows. An electronic device may be detected via an app. The electronic device may be at or near a point of transaction location. A point of transaction location may be a POI (e.g., an amusement park, theatre, parking garage, etc.) or a vending machine or ticket booth associated with a POI. For example, an electronic device may be detected at or near a point of transaction location based at least in part on a geographic location of an electronic device that may be detected and/or provided by an app. For example, an app may continuously monitor a geographic location of an electronic device, or the app may provide a geographic location of an electronic device as a result of a casting motion or gesture being detected, or a casting or pointing search being initiated, for example, by a user input to an interface of an app. An orientation of an electronic device may be detected, for example, using an app running on the electronic device.

A gesture directed at a point of transaction location may be detected at least in part with an electronic device, using systems or methods described herein. For example, the gesture may correspond to a shaking or rotation of the electronic device. In one or more implementations, a geographic region corresponding to the gesture may be determined. The geographic region corresponding to the gesture may be used to identify possible transactions associated with the point of transaction location based at least in part on the geographic region. In some implementations, the possible transactions may be identified locally on an electronic device. In some implementations, the possible transactions may be identified by a remote server or database. For example, information indicative of a geographic region corresponding to the gesture may be communicated by an electronic device to a server, and the server may use the information to determine possible transactions and related transaction details that are associated with the point of transaction location. Transaction details may be retrieved, for example, from the server or electronic device. One or more presented transactions of the possible transactions may be presented on a display of an electronic device. The presented transaction may be displayed via a user interface of an app running on an electronic device and may be selectable by a user of the electronic device via the user interface. In some implementations, an input indicating a selected transaction may be received via a user interface of an electronic device. The transaction may then be processed.

Various additional examples will now be provided. In one or more implementations, a pointing/casting application may have sponsored listings to be clicked on of local or national brand relevance. In an example, users cast or point electronic devices at a soccer game and an advertisement for sporting goods or soft drinks may be provided along with other listings. In an example, a user may be presented with an option to purchase goods or services related to the advertisement. Users may select goods/services for purchase and delivery to addresses selected by users. In another example, users may utilize casting searching to purchase activities or services (ferry, baseball game, amusement park ride, train) at the point of transaction. An app may communicate with a remote database to obtain possible transactions in the remote database that are associated with the point of transaction location based on the geographic location of the electronic device. Transaction details may be retrieved and presented on a display, for example, of a user interface of the electronic device. Users may select transactions (e.g., purchase tickets) through an app of the electronic device instead of waiting in line or using vending machines at the point of transaction. The purchased tickets may be stored and redeemable via the app. Implementations that utilize actionable advertising may be incorporated into an app that utilizes pointing or casting. In one or more implementations, listings associated with POIs are stored in databases accessible to the app. Listings may contain clickable advertisements based on pointed local relevance. Data analytics may be incorporated for measurable performance of user's advertising effectiveness. At every stage ex: viewed ad banner to clicked, viewed on the phone to contacted or purchased.

Due to limited space on mobile phones, the opportunities to advertise or sponsor may be limited therefore the right to advertise or sponsor may be sold on an auction manual or automated.

Commercial companies may utilize the ability to point and search to provide additional information about their business, products and services, setup appointments, answer any questions through their real-world assets (fixed and mobile). For example, a bakery delivering breads may have their vans painted with their bakery name, picture and a website but the website may be too long or hard to read from a distance. However, if a user casts and clicks on the van, can get data from the mobile location enabled van that updates its position real-time or an employee who is carrying a smartphone that is location-enabled that has the information about the business now geotagged dynamically as the company assets are moving. The users who found this business info by pointing and clicking can review more information, further connect, communicate, purchase, setup an appointment or perform any other transaction. This simplifies the contacting process, as the user attempting to contact the commercial entity can do so without requiring that the real-world asset include connection-enabling capabilities. Thus, the bakery truck, and thus the bakery can be located without requiring equipment on the truck for communicating electronically or otherwise with nearby potential customers.

In one or more implantations, when a company advertises on their own or through third party advertisers, the real-world billboard locations are geolocated and the information about the advertised company, their product or service or any actionable access web pages are tagged with the geo-location. When a user views such billboard ads or banners in the real world and clicks on the information that is matched and found can learn more by being directed to landing web pages or actionable web pages or communicate further interests or perform transactions with that business that is being advertised.

In one or more implementations, commercial companies can use point search and connect system and method for managing their real-world assets to access, check status, perform maintenance or update any information by just pointing and clicking on the assets. The access may be limited to their employees and authorized contractors who are authenticated post login. Alternately, the assets may be found and further to access more proprietary information a login may be required.

In one or more implementations, once the users point and connect with a business location, they may get offers/discount coupons, request reservations, enquire about a product/service etc. Users can also connect with the pointed business and exchange transaction data like receipts, coupons etc. without actually sharing their real contact information.

In one or more implementations, users can transact and transfer internet currencies, cryptocurrencies, or checking/credit/debit card payments once they point and connect using the point-and-chat application. The data about the transaction can be transferred through a direct secure protocol between the users or users and businesses, once their identities are established through the point-and-chat application. Users may meet in person, point their smartphone or watch at each other, select the person that matches the geolocation pointed at in proximity and once their identities are connected, they can enter the amount of money to be transferred from one to another, mutually confirm and complete the transaction. The parties involved in the transaction could be a customer and a business for example or a business to business or simply a user to user.

In one or more implementations, users when connected with other users or services may exchange data once the connection is established. The data may be over an encrypted protocol and the data may additionally be encrypted. For example, when a user is checking into an airport terminal, they point at the airline desk, get connected to a geolocated kiosk, and transfer their ticket information and get a boarding pass from the kiosk. In another example, a driver and/or a passenger of a rideshare application may point or cast with the other to match and confirm identifies prior to initiating a rideshare transaction. Similar data exchange mechanisms may be used to exchange invoices, make payments and get receipts between a user and any service provider.

In one or more implementations, a link from casting or pointing search may be a matched result that is directed to an app store for further reviewing and downloading an app such as a mobile phone application. In another example, there may be a link from a casting or pointing matched result to be directed to open an audio file like mp3 or play a video directly. Examples include audio description of a building or a video presentation. In another example, there may be a link from the point and search matched result to be directed to open a pdf file automatically.

Point and search can be used to pay for space rentals or other product rentals from real physical locations, without having to type and search but by point and locate. Such methods of payment avoid entering account/card information when the user is on the move and is more secure because they do not use their card swipe in random outdoor locations. The check/credit/debit card information may be stored for each user in an authorizing gateway for added security.

In an example, point and search may be utilized in parking or renting shared transportation (e.g., bikes, scooters). Once the user points or casts their smartphone or watch for example, a space number can pop up with the name of the parking lot and the amount of time to be selected. Then the dollar amount may be displayed to confirm and submitted for automatic payment from the user's account for a credit/debit card or checking account transaction to pay for parking. In an example involving purchasing shared transportation, the transportation is made accessible (e.g., unlocked) after payment has been made.

Additionally, the exact physical location may be bookmarked for convenience for the users to return to. In some implementations, the return time or rental use may be measured and only charged up to that usage at closeout and payment.

Pointing and casting can be used in various payment implementations. In an example, users can cast or point and pay at a toll booth, by way of matching the user's identity with that's on file in the toll payment system. In another example, a user may point at a gas station and pay for gas there with their card on file in the system. The authorization can be centralized at the gas company and the authorization data issued from remote location to the specific pump. This increases security without requiring a card to be swiped at the road location. In still yet another example, a user may be able to point at a commercial transport system and buy their tickets by selecting further options and preferences and pay for their trip. The conformation and ticket may be instantly displayed for easy show and verification. Alternately, the system detects a passing user, can automatically recharge their accounts for payment using the payment information that's saved on the user's account.

In another example, tickets may be purchased by users just by pointing and further selecting their seating preferences. They may even pay for popcorn, hotdog or soda further by pointing, choosing from a menu displayed and paying. In some cases, the user preferences may be saved, based on the context and retrieved for the next time use.

Tracking user geographic locations in connection with pointing or casting may provide additional functionality. For example, as the user's geolocation is being updated in the system, in case of an emergency near the user, the user or users in that location perimeter may be notified of alerts and instructions. For example, an app may provide an alert of a crime in progress or fire that has been determined to be near a user. In another example, there may cases where people with certain criminal records and restrictions may be present in the vicinity and other users in the same area may want to be notified for safety. Users may also point along their path of walk to check of any past crime incidences or criminals present in the path.

Pointing and casting may be incorporated into Internet of Things applications. For example, geo-descriptors with pointing enabled search and connection can be used to get or send data to IOT devices and systems.

Pointing and casting may be utilized in connection with providing offers. For example, users may request special offers and discounts over geo-matched businesses by pointing or casting and clicking.

Pointing and casting may be utilized to send requests to one or multiple businesses or services. For example, a user may point, connect and send a request for a product or a service. The request may include text, photos or a video that may be saved in the user's smartphone and used again to send the request to other matched services in a sequential or in a multi-select mode. Examples include that the user may request a table at 2-3 restaurants that matched in a certain direction of pointing and the same request may be send to few other restaurants in a subsequent point and search.

Pointing and casting may be utilized in connection with providing Uniform Resource Locator (URL) and sub URLs. For example, a search engine that maintains geo-coded entities for the results may maintain sub URLs for local specific information. In an implementation, the user might point at a department store in a particular city and street may take the user to a URL that is parametrically encoded with the location data and the main corporate store URL.

Pointing and casting may be utilized to provide Vendor Relationship Management (VRM) information. For example, user preferences, history and other options may be saved in a user profile and database. In an implementation, based on the user language preference set, the information about a matched listing may be presented in the preferred language. User searches after pointing and clicking/casting or casting may be saved in history for users to access it again at a later time and share with friends in a social or business application.

Pointing and casting may be utilized in connection with file sharing. For example, users who are connected by pointing can share files including media without having to exchange their contact information. The connection essentially becomes temporary for the purpose of sharing the file. For example, a user may have taken a good photograph that they want to share with someone that they just met at a tourist spot but are not keen on exchanging contact information or any further follow up. The intermediate service can determine their respective location, make a temporary connection and facilitate the file transfer.

Pointing and casting may be utilized in connection with categorizing and presenting large amounts of data. When many people sign up for a service and make their geo-presence available and objects get added with geolocation, the volume of matched results will increase even within a certain projected area. Options may be available to specify a category or keyword to narrow the product or service search or person's parameters such as gender, age, activities, hobbies, etc. Additionally the results may be presented to the user in a distinguishable manner with different colors or layout based on the category/keywords or personal parameters or business/entity type.

Pointing and casting may be utilized in connection with categories or information parameters. For example, the user may specify parameters such as search phrases ex: best restaurants around me, keywords ex: cheap gas, category names ex: restaurants or bus stop. The input may be typed as text or input with voice by the user and converted to text by the system. The users may actually see a real physical object such as a building or store or simply search for examples in the direction of travel.

The method and systems described herein may be used in various settings and compatible with various technologies. For example, implementations disclosed herein may be used outdoors in streets or indoors such as office buildings, university campuses, entertainment parks, shopping malls, airport, train stations, etc. The methods and systems described herein may be used in connection with other methods of identifying objects such as using a QR (quick response) code image by scanning and decoding data may be additionally integrated with the same system for a unified approach to point search and information retrieval. Casting or pointing may find RFID chips and systems, POD devices meant for tracking things like assets or pets for example. In case of matching these, the information about the asset or pet may be used to report to the real pet or asset owner in case of lost, out of range detection by a point search user.

Casting or pointing search may be incorporated into vehicle controls. For example, point and search may be used from a car with gesturing controls in conjunction with the rotary knob to point in the direction of interest or in the direction of driving. The amount of rotation of the knob with respect to the direction of the car can provide the heading angle with respect to geo coded search results to be matched.

The method of searching and matching with geographical coordinates and pointing angle may be extended to third party partners to use by means of an API (application program interface). For example a real estate company may request to map geo coded search results in the direction of pointing by supplying their data that includes all mapped results within a radius, the user's geo location and the pointed angle from the user's device. These data may be transmitted and receive matched results over the API.

In one or more implementations, pointing or casting may be used to improve indexing and search speed/efficiency. Considering the amount of entities including potentially billions of people and billions of objects (buildings, locations, etc.), the matching of results within a given radius or rectangular distance may be computationally intensive and very slow. A new way would be to updating the location of the user or object into the sliced cells of the global map and then matching the id number of the sliced cell to what's in the database and selecting the list of all the people and object that are within the matched cell and neighboring cells. Variable cell sizes may be defined based on the population density, such as multiple hundreds of kilometers oceans versus a few tens or hundreds of feet for a downtown area in a big city. This index based geo-mapping approach can provide for a quick binary search and can avoid the need to compute distances for each person or object thereby tremendously increases matching response time efficiency.

According to one or more embodiments, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
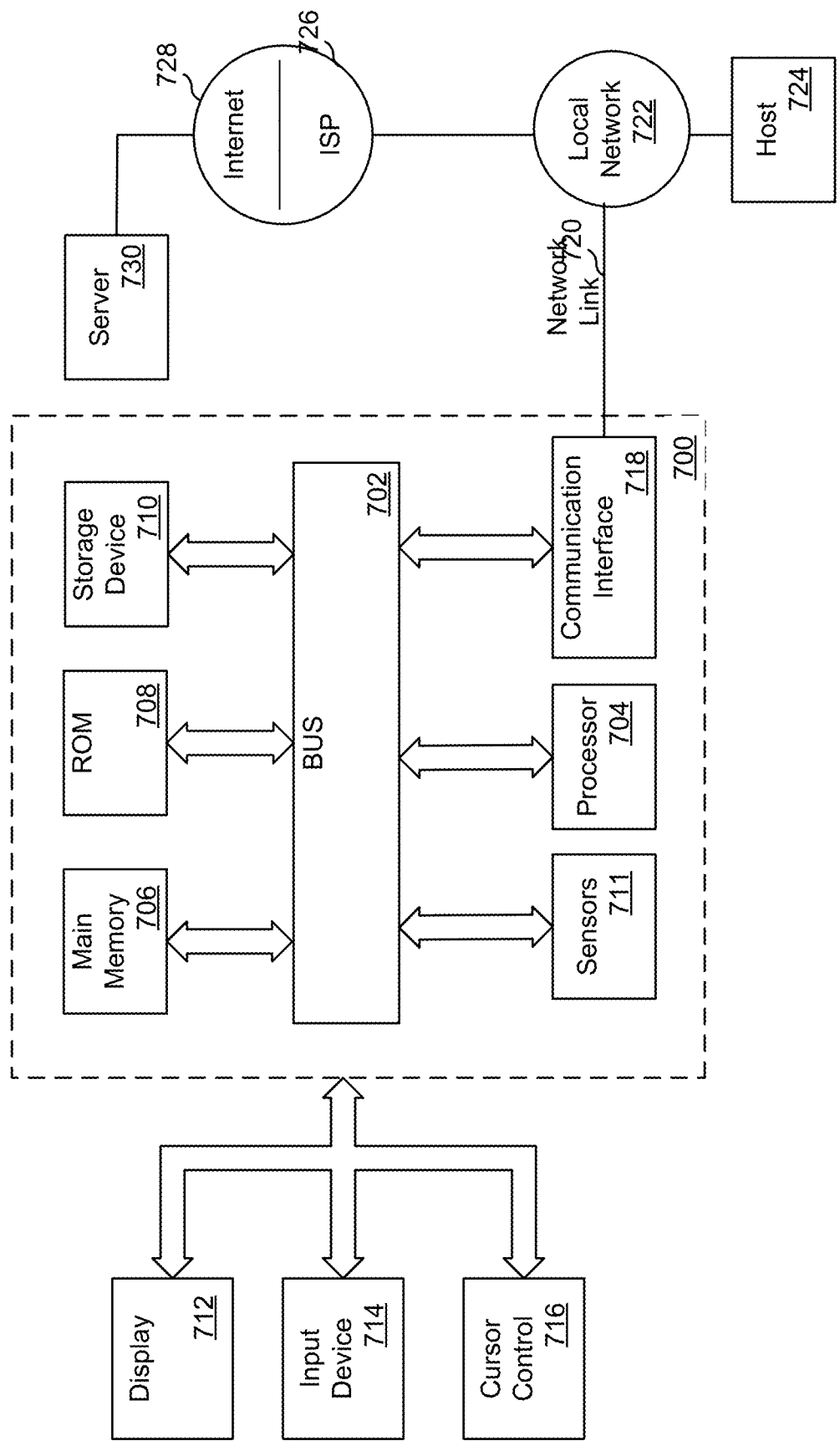
FIG. 7 shows hardware that might implement the user interface.

For example, FIG. 7 is a block diagram that illustrates a computer system 700, such as electronic devices discussed herein, upon which an embodiment of the invention may be implemented. Computer system 700 includes a bus 702 or other communication mechanism for communicating information, and a processor 704 coupled with bus 702 for processing information. Processor 704 may be, for example, a general purpose microprocessor and may include a plurality of processors or "cores."

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions. Sensors 711 may be coupled to bus 702. Sensors 711 may be utilized for determining geographic location, rates of angular motions, and pointing direction. For example, sensors 711 such one or more accelerometers, one or more gyroscopes, a compass, and/or a GPS unit may be included in the computer system 700, and may be used to determine a rate of angular motion, geographic location, and a pointing direction associated with the computer system 700.

Computer system 700 may be coupled via bus 702 to a display 712, such as, for example, a computer monitor, touchscreen, or augmented reality headset for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. Wireless links may also be implemented. In any such implementation, communication interface 718 sends and receives electrical, electromagnetic or optical signals that carry digital data streams representing various types of information.

Host computer 724 may include search servers or databases. In some implementations, search results (e.g. POIs and related information) may be obtained by computer system 700 from host computer 724. Databases might be custom or third-party databases and might provide for access via APIs. Different sources of data from third parties may provide results differently. POIs may be cashed locally on computer system 700 or stored on the host computer 724.

Network link 720 typically provides data communication through one or more networks to other data devices. For example, network link 720 may provide a connection through local network 722 to a host computer 724 to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In operation, as has been described, an app may identify a triangle, where the triangle may be defined by (a) the smartphone's current geographic location, (b) the smartphone's current compass orientation, and (c) some distance/scale, or other polygonal region of interest. In some cases, a search might be done on a larger scale, such as a circumscribed circle, and the results filtered to the polygonal region of interest.

The app might send a search engine a search query comprising (a) a search string, (b) a search target geographic location, and (c) a search radius, then obtain the search query hits (such as a set of URLs), wherein each hit (a) relates to the search string and (b) has a geographic identifier (perhaps as metadata) that associates the hit with a geographic location, wherein the search result hits are limited to hits with geographic identifier that identifies the hit has having an associated geographic location that is within a circle of the specified search radius around the specified search target geographic location. Then, the app, or a service filters the returned search query hits to remove the hits that have associated geographic locations within the circle but outside of the polygonal region of interest.

FIGS. 1-4 illustrate possible modes of operation of the geographical search system returning a geographical search result as determined by the comparison between the results returned when performing geographical searches utilizing two distinct geographical areas.

FIG. 1 is an illustration 100 in plan view, i.e., from above, of a possible mode of operation of the geographical search system. The position of the mobile device is determined to be at location 101. The pointing direction of the mobile device directional reference 102 is determined to be due north for simplicity of explanation. A first search of a geographical database of objects is initiated to determine the objects within a circular geographical area 103 centered on the determined location 101 of the mobile device. This search returns a result of objects A 105, B 106, C 107, D 108 and E 109. A second search is then initiated to determine those objects returned as a result in the first search that are also within a second geographical area, in this case an equilateral triangle 104, fully encompassed by the circular geographical area 103, also centered on the determined location 101 of the mobile device and oriented as illustrated in relation to the determined pointing direction 102 of the mobile device. This second search returns a result of objects A 105, B 106 and C 107. The results of this second search also indicate that object C 107 is just barely "in front of" the determined location 204 of the mobile device (i.e., it is in the general direction of the determined pointing direction of the mobile device directional reference 102), and objects A 105 and B 106 are "behind" the determined location 101 of the mobile device (i.e., they are in the opposite of the general direction of the determined pointing direction of the mobile device directional reference 102). The results of such a search may then be presented to the user with the indication that object C 107 is "in front of" the mobile device, and hence the user of the mobile device, and that objects A 105 and B 106 are not "in front of" the mobile device but is instead are "nearby."

Figure 2:
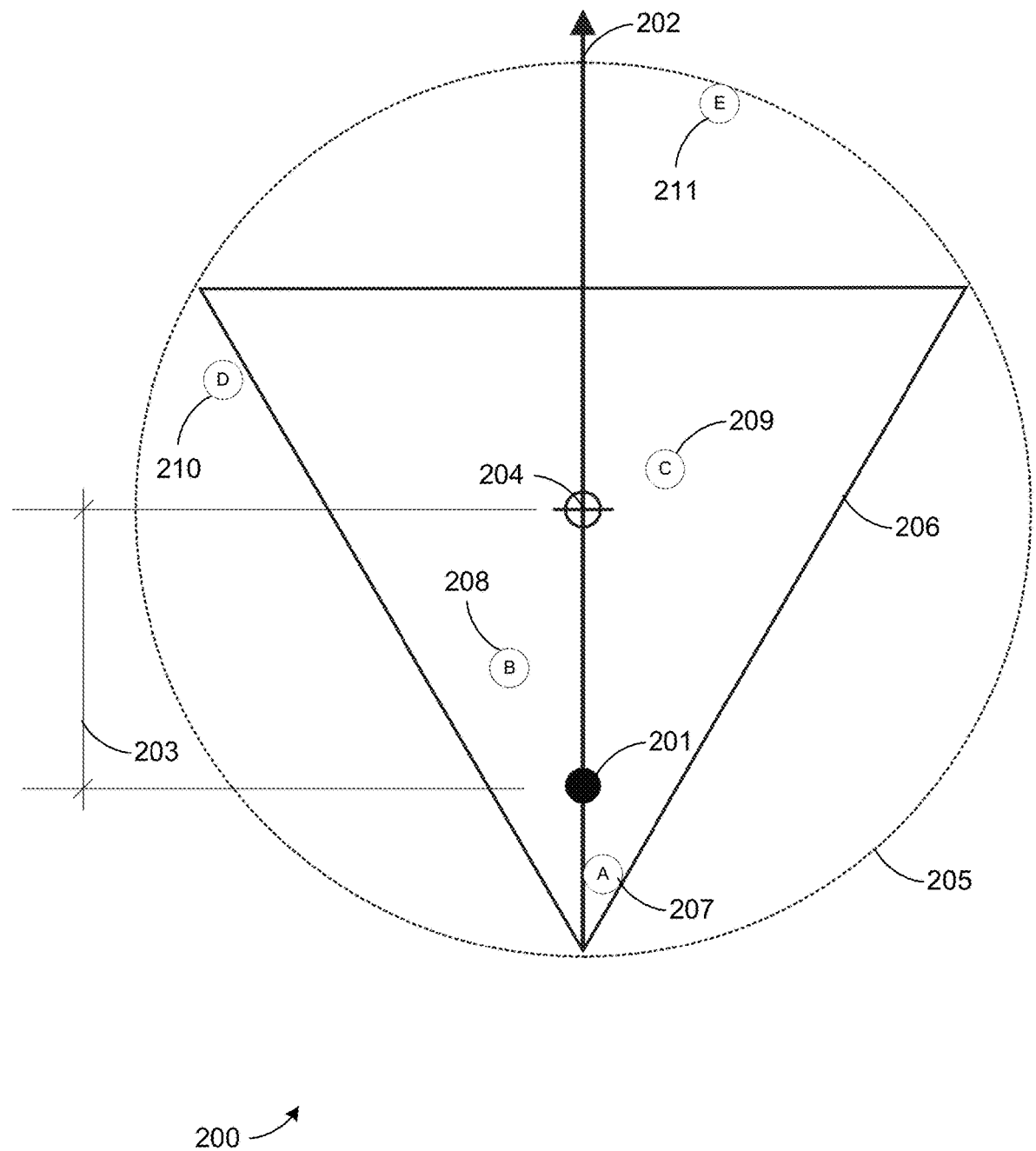
FIG. 2 is an illustration in plan view of a more advanced mode of operation of the geographical search system incorporating a geographical offset.

FIG. 2 is an illustration 200 in plan view of a more advanced mode of operation of the geographical search system incorporating a geographical offset. The position of the mobile device is determined to be at location 201. The pointing direction of the mobile device directional reference 202 is determined to be due north for simplicity of explanation. A geographical offset 203 along the vector from the determined location 201 of the mobile device as defined by the pointing direction 202 of the mobile device is used to determine the offset search location 204. A first search of a geographical database of objects is initiated to determine the objects within a circular geographical area 205 centered on the determined offset search location 204. This search returns a result of objects A 207, B 208, C 209, D 210 and E 211. A second search is then initiated to determine those objects returned as a result in the first search that are also within a second geographical area, in this case an equilateral triangle 206 also centered on the determined location offset search location 204, fully encompassed by the circular geographical area 205, and oriented as illustrated in relation to the determined pointing direction 202 of the mobile device. This second search returns a result of objects A 207, B 208 and C 209. The results of this second search also indicate that object B 208 and C 209 are "in front of" the determined location 201 of the mobile device (i.e., they are in the general direction of the determined pointing direction of the mobile device directional reference 202), and object A 207 is "behind" the determined location 204 of the mobile device (i.e., it is in the opposite of the general direction of the determined pointing direction of the mobile device directional reference 202). The results of such a search may then be presented to the user with the indication that objects B 208 and C 209 are "in front of" the mobile device, and hence the user of the mobile device, and that object A 207 is not "in front of" the mobile device but is instead "nearby."

Figure 3:
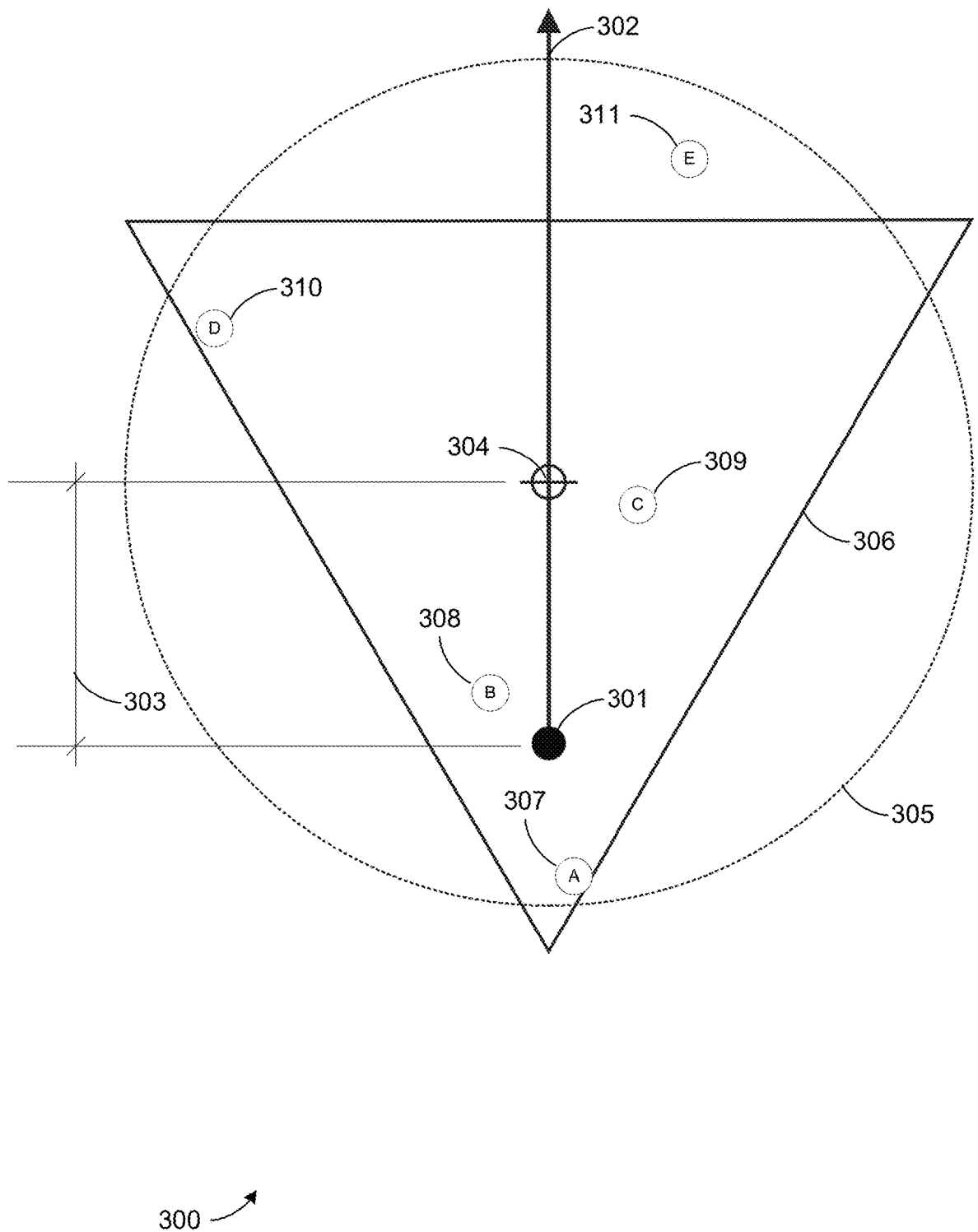
FIG. 3 is an illustration in plan view of a more advanced mode of operation of the geographical search system incorporating a geographical offset and a second geographical search area not fully encompassed by the first geographical search area.

FIG. 3 is an illustration 300 in plan view of a more advanced mode of operation of the geographical search system incorporating a geographical offset and a second geographical search area not fully encompassed by the first geographical search area. The position of the mobile device is determined to be at location 301. The pointing direction of the mobile device directional reference 302 is determined to be due north for simplicity of explanation. A geographical offset 303 along the vector from the determined location 301 of the mobile device as defined by the pointing direction 302 of the mobile device is used to determine the offset search location 304. A first search of a geographical database of objects is initiated to determine the objects within a circular geographical area 305 centered on the determined offset search location 304. This search returns a result of objects A 307, B 308, C 309, D 310 and E 311. A second search is then initiated to determine those objects returned as a result in the first search that are also within a second geographical area, in this case an equilateral triangle 306 also centered on the determined location offset search location 304, in this case not fully encompassed by the circular geographical area 305 (i.e., at least part of the second geographical search area 406 is outside the first geographical search area 405), and oriented as illustrated in relation to the determined pointing direction 202 of the mobile device. This second search returns a result of objects A 307, B 308, C 309 and D 310. The results of this second search also indicate that objects B 308, C 309 and D 310 are "in front of" the determined location 301 of the mobile device (i.e., they are in the general direction of the determined pointing direction of the mobile device directional reference 302), and object A 307 is "behind" the determined location 304 of the mobile device (i.e., it is in the opposite of the general direction of the determined pointing direction of the mobile device directional reference 302). The results of such a search may then be presented to the user with the indication that objects B 308, C 309 and D 310 are "in front of" the mobile device, and hence the user of the mobile device, and that object A 307 is not "in front of" the mobile device but is instead "nearby."

Figure 4:
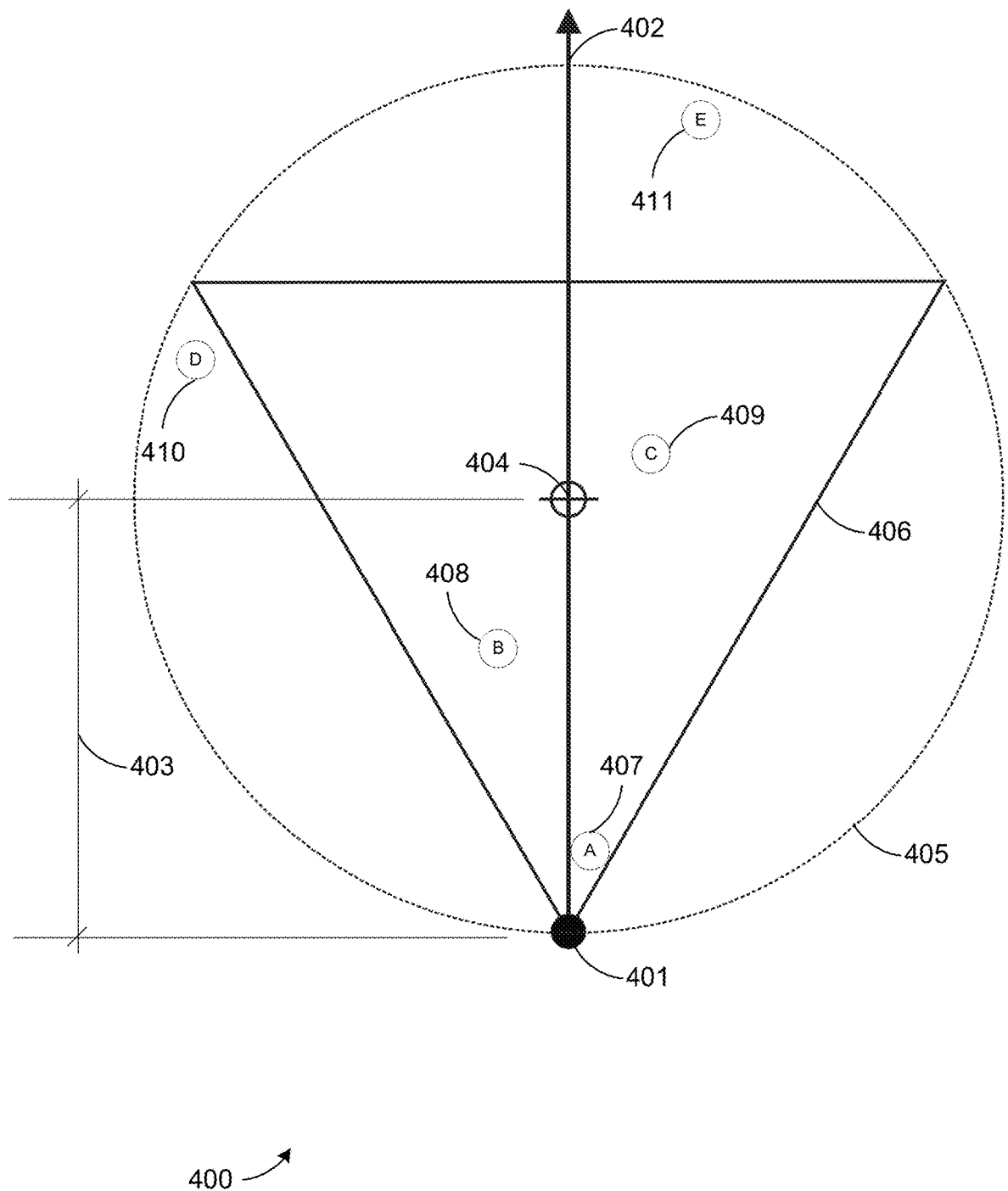
FIG. 4 is an illustration in plan view of a more advanced mode of operation of the geographical search system incorporating a geographical offset and a determined mobile device location which is on the perimeter of a first geographical search area.

FIG. 4 is an illustration 400 in plan view of a more advanced mode of operation of the geographical search system incorporating a geographical offset and a determined mobile device location which is on the perimeter of a first geographical search area. The position of the mobile device is determined to be at location 401. The pointing direction of the mobile device directional reference 402 is determined to be due north for simplicity of explanation. A geographical offset 403 along the vector from the determined location 401 of the mobile device as defined by the pointing direction 402 of the mobile device is used to determine the offset search location 404. A first search of a geographical database of objects is initiated to determine the objects within a circular geographical area 405 centered on the determined offset search location 404 and with a radius of the geographical offset 403. This search returns a result of objects A 407, B 408, C 409, D 410 and E 411. A second search is then initiated to determine those objects returned as a result in the first search that are also within a second geographical area, in this case an equilateral triangle 406 also centered on the determined location offset search location 404, fully encompassed by the circular geographical area 405, and oriented as illustrated in relation to the determined pointing direction 402 of the mobile device with one of the vertices of the triangle collocated with the determined location 401 of the mobile device. This second search returns a result of objects A 407, B 408 and C 409. The results of this second search also indicate that objects A 407, B 408 and C 409 are "in front of" the determined location 401 of the mobile device (i.e., they are in the general direction of the determined pointing direction of the mobile device directional reference 402). The results of such a search may then be presented to the user with the indication that objects A 407, B 408 and C 409 are "in front of" the mobile device and hence the user of the mobile device.

It should be noted that while a circular geographical area is used for the first geographical search and an equilateral triangular geographical area is used for the second geographical search in the above examples illustrated by FIGS. 1-4 and associated text this was done for illustrative purposes only and that any defined geographical area, be it a regular polygonal shape such as a rectangle, triangle, hexagon, etc. or irregular shape, may be substituted for either geographical search area in the operation of such a system. It should also be noted that while the first and second search areas in the examples above are centered on either the determined location of the mobile device or the determined offset location this need not always be true either for the system as described to operate. All that is required is a defined relationship and orientation with the determined location and pointing direction of the mobile device.

Figure 5:
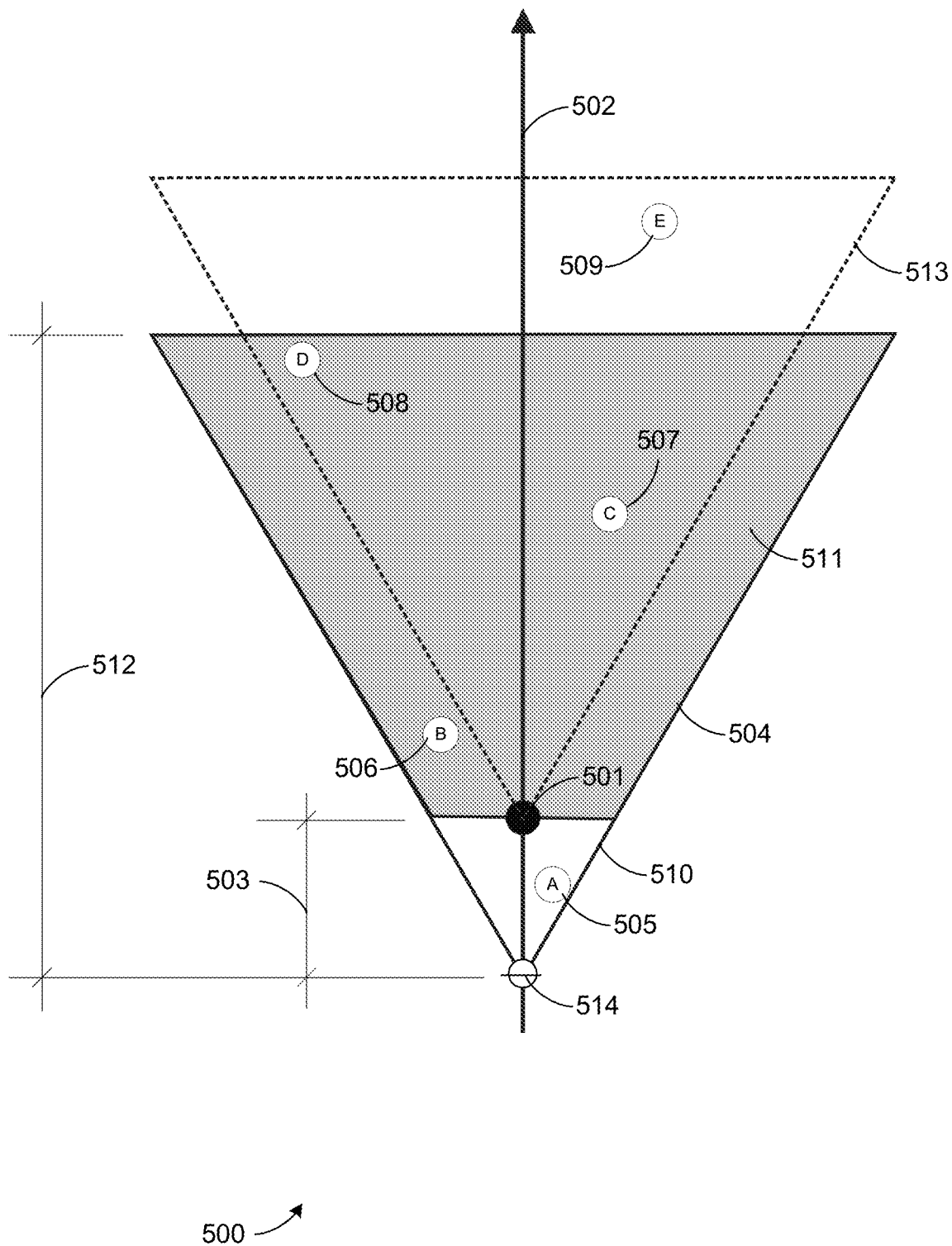
FIG. 5 is an illustration in plan view of a possible mode of operation of the geographical search system returning a geographical search result as determined by the eliminating the result of a second geographical search from that of a first geographical search.

FIG. 5 is an illustration 500 in plan view of a possible mode of operation of the geographical search system returning a geographical search result as determined by the eliminating (i.e., subtracting) the result of a second geographical search from that of a first geographical search. The position of the mobile device is determined to be at location 501. The pointing direction of the mobile device directional reference 502 is determined to be due north for simplicity of explanation. A geographical offset 503 along the opposite of the vector from the determined location 501 of the mobile device as defined by the pointing direction 502 of the mobile device is used to determine the offset search location 514. A first search of a geographical database of objects is initiated to determine the objects within a first geographical area, in this case an equilateral triangle 504 with one of the vertices of the triangle collocated with the offset search location 514, the symmetry axis of the triangle being parallel to the determined pointing direction 502 of the mobile device, and the triangle having a set altitude 512. This search returns a result of objects A 505, B 506, C 507 and D 508. A second search of a geographical database of objects is then initiated to determine the objects within a second geographical area, in this case an equilateral triangle 510 with one of the vertices of the triangle collocated with the offset search location 514, the symmetry axis of the triangle being parallel to the determined pointing direction 502 of the mobile device, and the triangle having a set altitude of the geographical offset 503. This search returns a result of object A 505. The result of the second geographical search is then compared to the result of the first geographical search and any objects present in both searches are eliminated, i.e., the result of the second search is subtracted from the result of the first search. Object A is present in the results of both searches and is therefore eliminated. This then provides a third search result for a geographical area 511, shown in gray, of objects B 506, C 507 and D 508. This method provides a directional geographical search that will provide more satisfactory results to a user of the system in that the "base" of the search would in effect be widened to ensure that objects nearby but not directly in front of the user, i.e., in the determined pointing direction 502 of the mobile device, will also be included. In comparison to the search described above a geographical search done using an equilateral triangle 513 with the same dimensions and orientation as the equilateral triangle 504 that was used for the first geographical search but with no geographical offset from the determined location 501 of the mobile device would return results of C 507, D 508 and E 509 and would miss object B 506.

Figure 6:
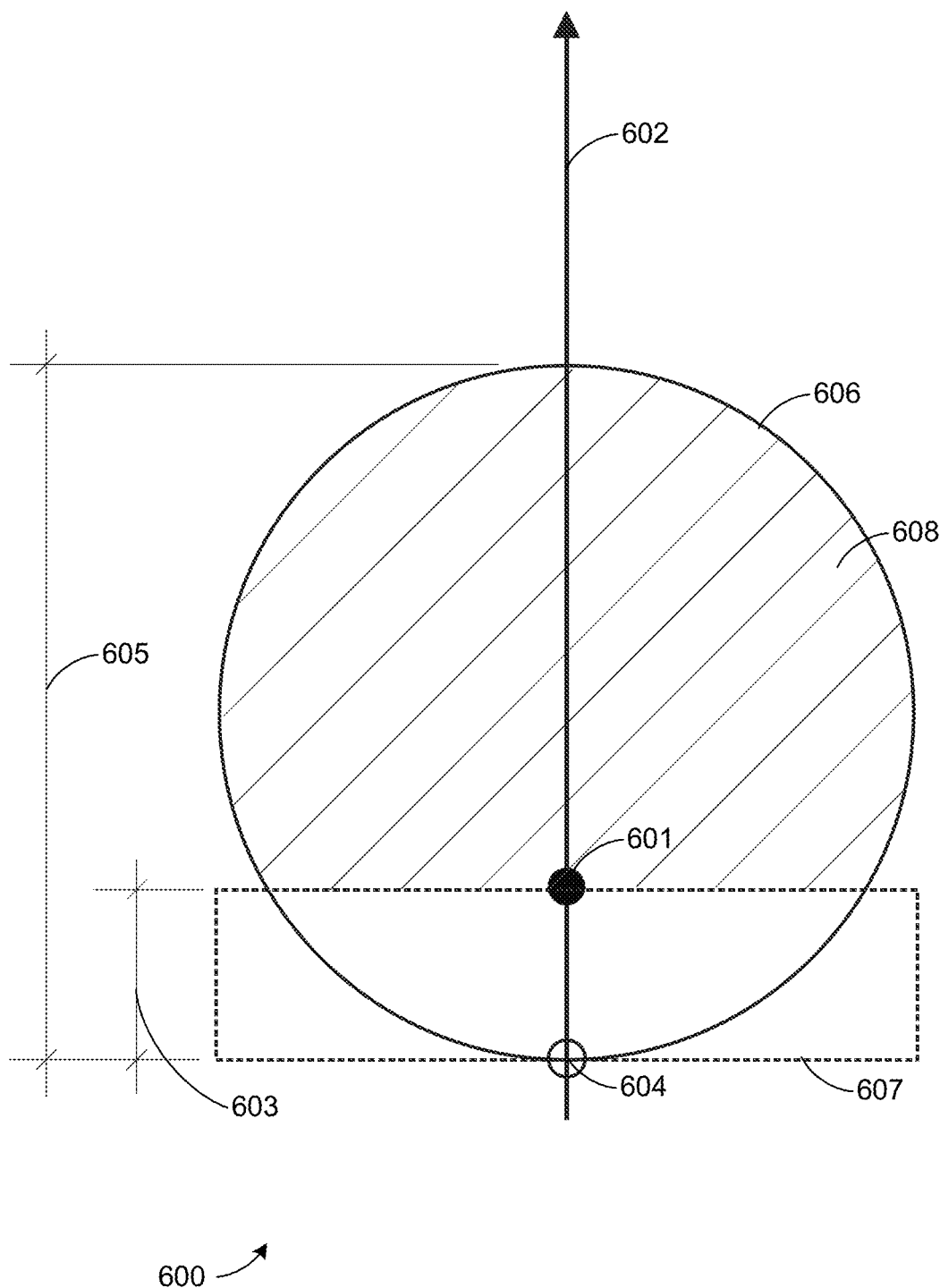
FIG. 6 is an illustration of a possible mode of operation of the geographical search system utilizing alternate geographical search areas.

It should be noted that while an equilateral triangular geographical area is used for both the first and second geographical areas and searches in the above examples illustrated by FIG. 5 and associated text this was done for illustrative purposes only and that any defined geographical area, be it a regular polygonal shape such as a circle, rectangle, triangle, hexagon, etc. or irregular shape, may be substituted for the first or second geographical search areas in the operation of such a system as illustrated in FIG. 6.

FIG. 6 is an illustration 600 of a possible mode of operation of the geographical search system utilizing alternate geographical search areas. The position of the mobile device is determined to be at location 601 and the pointing direction of the mobile device directional reference 602 is determined to be true north for simplicity of explanation. A geographical offset 603 along the opposite of the vector from the determined location 601 of the mobile device as defined by the pointing direction 602 of the mobile device is used to determine the offset search location 604. A first search of a geographical database of objects is initiated to determine the objects within a first geographical area, in this case a circle 606 with the offset search location 604 located on the perimeter of the circle, the symmetry axis of the circle being parallel to the determined pointing direction 602 of the mobile device, and the circle having a set circumference 605. A second search of a geographical database of objects is then initiated to determine the objects within a second geographical area, in this case a rectangle 607 with a width that of the geographical offset 603 and located and oriented as shown in relation to the offset search location 604 and determined pointing direction of the mobile device 602. The result of the second geographical search is then compared to the result of the first geographical search and any objects present in both searches are eliminated, i.e., the result of the second search is subtracted from the result of the first search. This then provides a third search result for a geographical area 608, shown as crosshatched.

In an example, a computing application, executable on a portable device, might comprise program code to at least: identify a triangle, where the triangle is defined at least in part by a current geographic location of the smartphone a current compass orientation of the smartphone, and a distance;

initiate a search, at least in part by providing a search query comprising a search string, a search target geographic location, and a search radius;

obtain a plurality of results for the search, wherein the individual results: relate to the search string; and include a geographic identifier that associate the respective result with a geographic location within a circle of the search radius around the search target geographic location; and filter the returned results to remove the results that have associated geographic locations within the circle but outside of the triangle.

The steps for an example cast search operation may include the following (it should be noted that the first three steps may happen simultaneously or in any order and that the system may be monitoring these parameters at all times and then use the readings at the time of the casting motion to determine the position and pointing direction of the cast):

1. A casting motion of the electronic device may be detected. For example, the casting motion may be detected if the rate of change of angular motion of the electronic device over a pre-set time period exceeds a pre-set threshold. In another example, the casting motion may be detected if an angle traversed over a pre-set period exceeds a pre-set threshold. The casting motion may be detected from movement of the mobile device in a horizontal or a vertical plane with respect to the ground. Detection of the casting motion may cause a user interface to be initiated.

2. The geographic location of the electronic may be determined for the cast. For example, the geographic location of the electronic device may be determined using a GPS of the electronic device and may correspond to the geographic location of the electronic device at the time of the cast. The geographic location of the electronic device may be represented by GPS coordinates or other systems for specifying a geographic location.

3. A compass bearing of the electronic device may be determined at the time of the cast. The compass bearing may be determined, for example, using a compass of the electronic device. The compass bearing may be used to determine the pointing direction of the electronic device.

4. A geographic region corresponding to a region of interest to the user may be determined. As discussed in more detail herein in connection with FIGS. 8-13, the geographic region associated with the casting may be determined using geographic position of the electronic device and the pointing direction of the electronic device. In some implementations, the geographic region may be defined by a shape with constant dimensions. In one or more implementations, the geographic region may be defined by dimensions that vary depending on the casting motion or the density of POIs at or around the geographic location of an electronic device.

5. A search/query for the geographic region defined by the cast for geo-located objects (POIs). These POIs may be cached locally on the electronic device or sourced from the Internet or other wireless data transmission, from a variety of sources and APIs.

6. The search results may be obtained by the electronic device. The results may be determined by the electronic device if, for example, the POIs are cached locally on the electronic device. If the POIs are sourced from the Internet or remotely via wireless transmission, then such POIs may be communicated to the electronic device from a server.

7. The results of the search/query may be displayed to the user. The results may be displayed on a display of the electronic device. The results may be filtered such that a subset of the results are displayed on the electronic device. A result may be selected by an input to the electronic device. For example, if the results are presented on a touch screen of an electronic device, a touch input may be used to select the result. In some implementations, a result may be automatically selected if, for example, the result is likely to be the result sought by the user. As a result of the result being selected, information related to the result may be obtained. The information may be obtained locally from an electronic device or communicated via a server.

In some implementations, the shape of the search area defined by the cast may be independent of the casting motion. In some implementations, casts will result in the same search area, distance and width of geographic area queried from the electronic device regardless of the casting motion used to initiate the query. From a small flick of the wrist to a long fast sweeping motion of the forearm, all the casts will result in the same search area. This default search area may be defined by the system or set by the user.

In some implementations, the search area defined by the cast may depend on the geographic location of the electronic device. For example, a distance of search may vary based on a density of a population density of POI density of a geographic location where an electronic device is located. It can be imagined that less POI dense areas (small town) may result in larger search areas, so that a threshold amount of POIs are returned by the search. Higher POI density area may result in smaller search areas so that a user is not overwhelmed by search results.

In some implementations, the search area defined by the cast may depend on the casting motion. It can be imagined that the type of gesture used to initiate a query may influence the defined search area. A small flick of the wrist or a small change in the electronic device's angle might result in a very short distance of search and a long, fast, sweeping motion of the forearm or entire arm or a large change in the electronic device's angle, might result in a much longer distance for the defined search area. The side to side motion of an electronic device may also influence the defined search area. A large change in bearing during a cast might result in a wider area of defined search. Combine these together along with the speed of a cast, rate of change of angle, and one can imagine a plethora of defined areas of search being initiated with different casting motions or gestures. Following are some examples of the system in use with differing types of casting motions or gestures.

Figure 8:
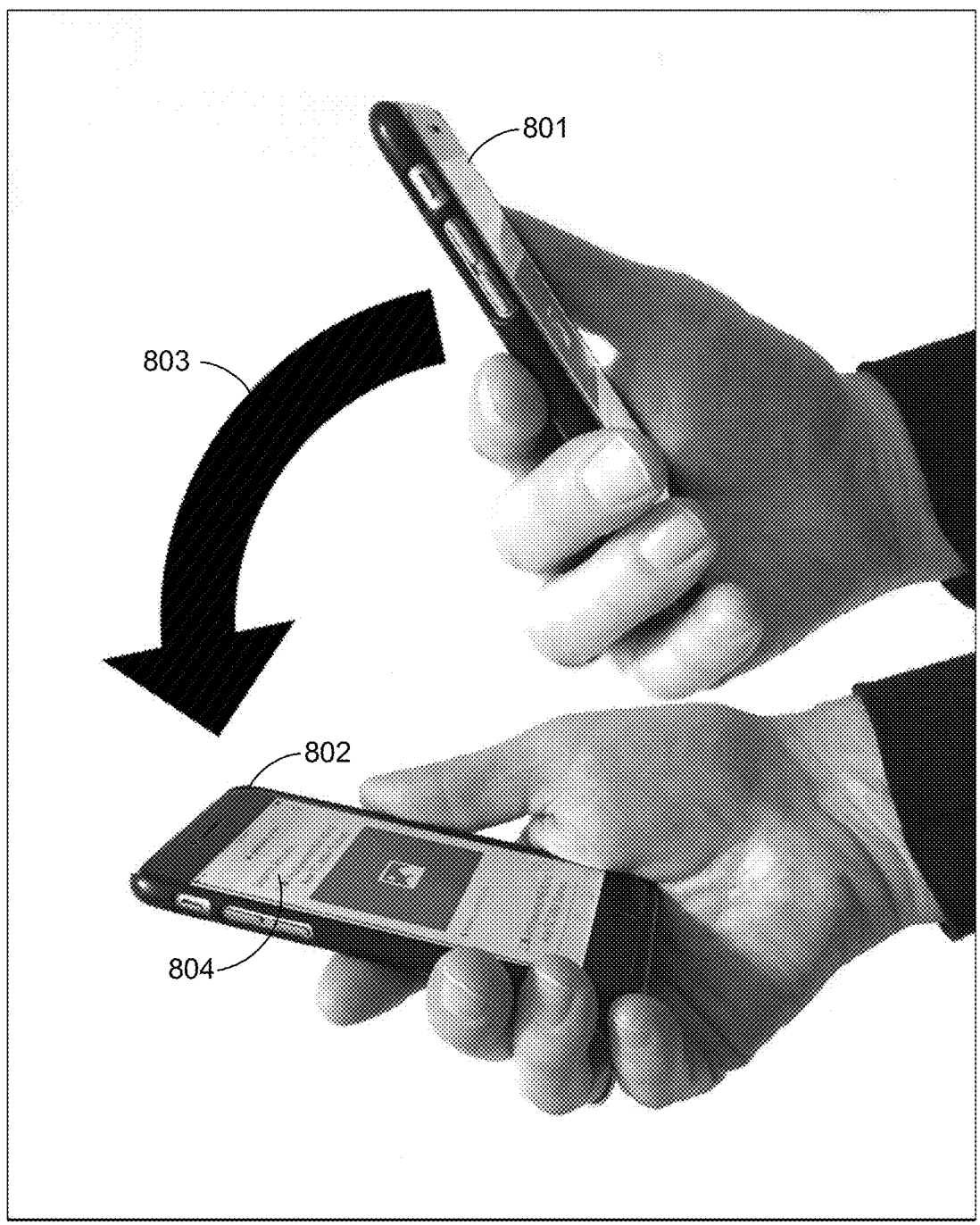
FIG. 8 is an image illustrating the physical motion of a gesture also defined as a "cast" or "casting".

FIG. 8 is an image 800 illustrating the physical motion of a cast. In FIG. 8, a mobile phone is shown in two positions, at the start of a cast 801 and the end of a cast 802. The motion between the two positions is shown as an arrow 803. As shown, the motion is in the vertical plane. In some implementations, motion in the horizontal plane may trigger a cast. This motion may be registered as the rate of change through the angle traversed, the actual angular change, or a combination of the two. The results of the search for the cast then may be displayed on the screen 804 of the electronic device. If the motion does not meet a threshold (e.g., rate of change of angular motion) in the horizontal and/or vertical planes, the motion may not register as a cast and thus the motion may be ignored. The threshold may be pre-defined or pre-set. In one or more implementations, the threshold is dynamically determined based on typical movement of the device.

Figure 9:
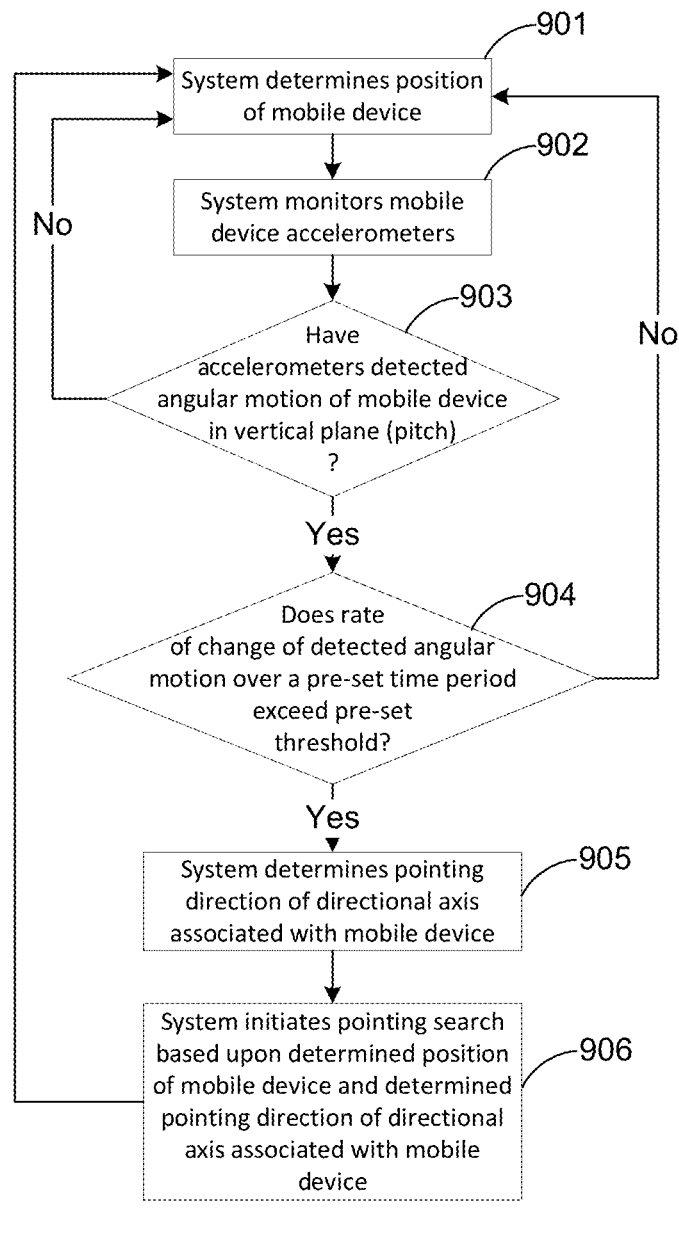
FIG. 9 is a flowchart illustrating a mode of operation of the "casting" system in which the rate of change of angular motion is the trigger to initiate a pointing search.

FIG. 9 is a flowchart 900 illustrating a mode of operation of the system in which the rate of change of angular motion is the trigger to initiate a pointing search. In step 901, the system determines the geographic location of the electronic device using for example, a GPS of the electronic device. The flowchart then branches to step 902. In step 902, the system monitors motion sensors (e.g., accelerometers and/or gyroscopes) associated with the electronic device. The flowchart then branches to step 903. In step 903, the system determines if motion of the electronic device in the vertical plane (pitch) has been detected. If motion in the vertical plane has not been detected, the flowchart branches back to step 901. If motion in the vertical plane has been detected, the flowchart branches to step 904.

In step 904, the system determines whether the rate of change of angular motion over a pre-set time period exceeds a pre-set threshold. An example of such a pre-set threshold may be 20°/sec. If the rate of change of motion over a pre-set time period does not exceed a pre-set threshold, the flowchart branches back to step 901. This would allow the system to ignore any extraneous motions, vibrations, etc. If the rate of change of motion over a pre-set time period does exceed a pre-set threshold, the flowchart branches to step 905. In step 905, the system determines the pointing direction of the directional axis associated with the electronic device using, for example, a compass of the electronic device. The flowchart then branches to step 906. In step 906, the system may initiate a pointing search based upon the determined geographic location and pointing direction of the electronic device.

Figure 10:
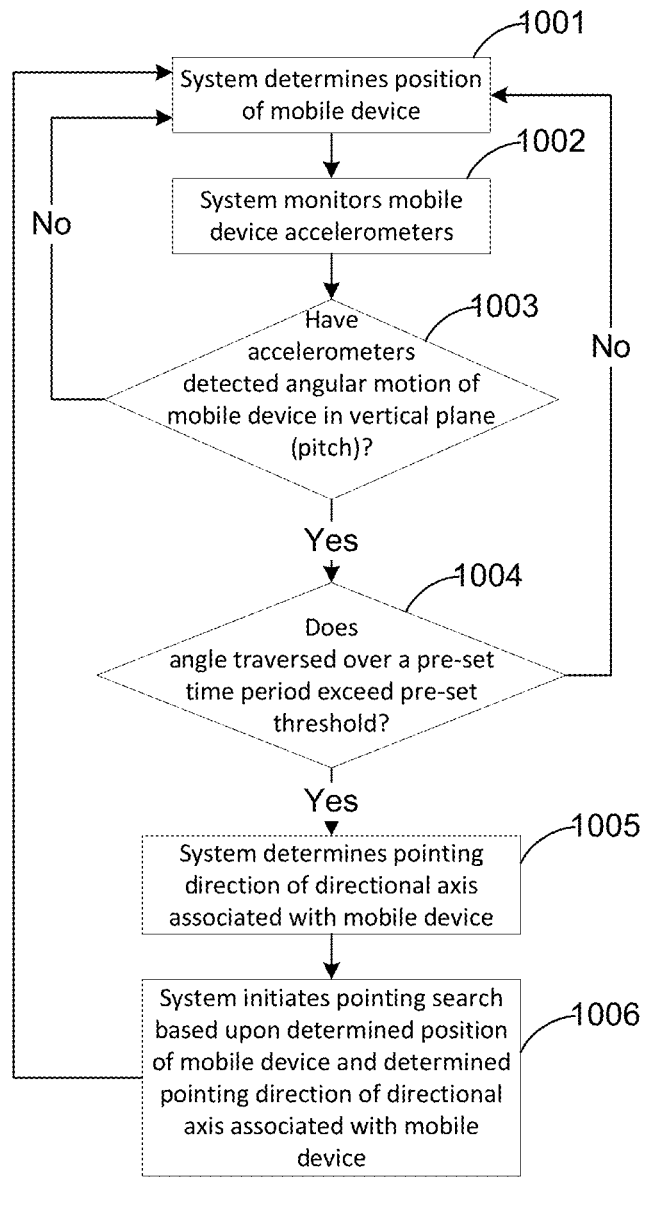
FIG. 10 is a flowchart illustrating a mode of operation of the "casting" system in which the angular change during the motion is the trigger to initiate a pointing search.

FIG. 10 is a flowchart 1000 illustrating a mode of operation of the system in which the angular change during the motion is the trigger to initiate a pointing search. In step 1001, the system determines the geographic location of the electronic device. The flowchart then branches to step 1002. In step 1002, the system monitors the accelerometers associated with the electronic device. The flowchart then branches to step 1003. In step 1003, the system determines if motion of the electronic device in the vertical plane (pitch) has been detected. If motion in the vertical plane has not been detected, the flowchart branches back to step 1001. If motion in the vertical plane has been detected, the flowchart branches to step 1004.

In step 1004, the system determines whether the angle traversed over a pre-set time period exceeds a pre-set threshold. If the angle traversed over a pre-set time period does not exceed a pre-set threshold, the flowchart branches back to step 1001. If the angle traversed over a pre-set time period does exceed a pre-set threshold, the flowchart branches to step 1005. In step 1005, the system determines the pointing direction of the directional axis associated with the electronic device. The pointing direction may be determined from a compass of the electronic device. The flowchart then branches to step 1006. In step 1006, the system initiates a pointing search based upon the determined geographic location and pointing direction of the electronic device.

Figure 11:
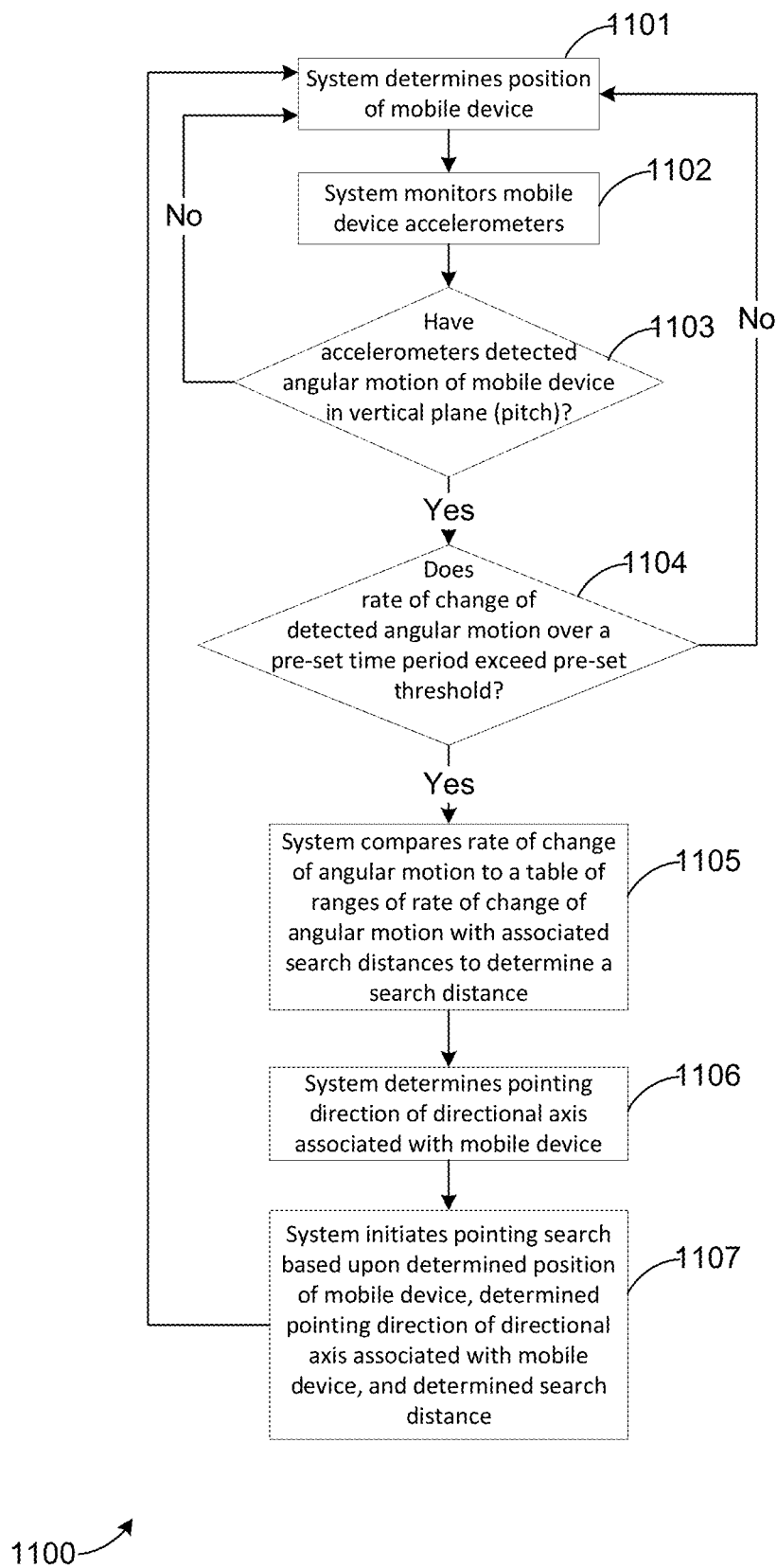
FIG. 11 is a flowchart illustrating a more advanced mode of operation of the "casting" system in which the rate of change of angular motion is the trigger to initiate a pointing search.

FIG. 11 is a flowchart 1100 illustrating an advanced mode of operation of the system in which the rate of change of angular motion is the trigger to initiate a pointing search. In step 1101, the system determines a geographic location of the electronic device. The flowchart then branches to step 1102. In step 1102, the system monitors the motions sensors (e.g., accelerometers, gyroscopes) associated with the electronic device. The flowchart then branches to step 1103. In step 1103, the system determines if motion of the electronic device in the vertical plane (pitch) has been detected. If motion in the vertical plane has not been detected, the flowchart branches back to step 1101. If motion in the vertical plane has been detected, the flowchart branches to step 1104.

In step 1104, the system determines whether the rate of change of angular motion over a pre-set time period exceeds a pre-set threshold. If the rate of change of motion over a pre-set time period does not exceed a pre-set threshold, the flowchart branches back to step 1101. If the rate of change of motion over a pre-set time period does exceed a pre-set threshold, the flowchart branches to step 1105.

In step 1105, the system compares the detected rate of change of motion to a table of ranges of rates of motion with associated search distances and recalls the search distance associated with the detected rate of change of motion. A simple version might have the respective rotational acceleration ranges and search distances of [20°/sec-40°/sec; 50 m], [40°/sec-60°/sec; 100 m], and [60°/sec+; 200 m], respectively.

In the above example if the detected rotational rate is 43°/sec, the above values would give a search distance of 100 meters. The flow then branches to step 1106. In step 1106, the system determines the pointing direction of the directional axis associated with the electronic device. The flow then branches to step 1107. In step 1107, the system initiates a pointing search based upon the determined geographic location and pointing direction of the electronic device and the determined search distance.

Although the modes of operation described herein with respect to FIGS. 9-11 describe monitoring motion in the vertical plane, it will be appreciated that in some implementations motion in the vertical plane may be ignored and motion in horizontal plane monitored to determine whether to initiate a pointing search. In other implementations, motion in both the horizontal and vertical planes may be monitored and compared to one or more respective thresholds to determine whether to initiate a pointing search and/or a size of the search area defined for the cast.

Figure 13:
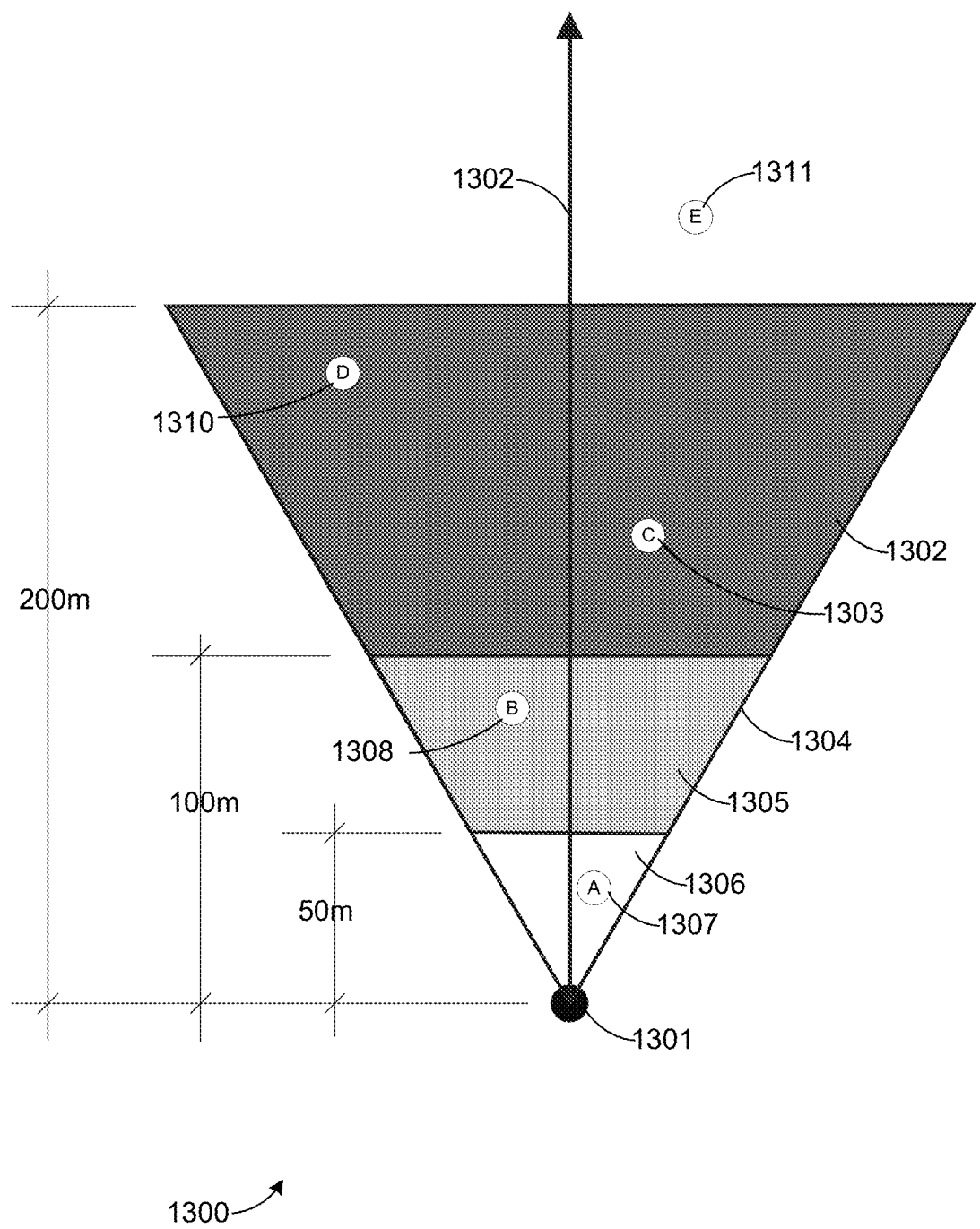
FIG. 13 is an illustration in plan view of a possible mode of operation of the "casting" system.

Referring now to FIG. 13, which is an illustration 1300 in plain view of the system as described above in FIG. 11 in operation. The position of the electronic device is determined to be at geographic location 1301. The pointing direction of the electronic device directional reference 1302 is determined to be due north for simplicity of explanation. A geographical area or shape, in this case a triangle 1303 with a base angle at the vertex associated with the geographic location 1301 of the electronic device of 60°, is associated with the determined geographic location 1301 and pointing direction 1302 of the electronic device in a predefined manner such as, in this case, the triangle's symmetry axis being collinear with the pointing direction of the electronic device. It should be noted that a triangle is used here as an example only and that the directional search may be applied to a simple vector defined by the position and pointing direction of the electronic device or any shape, and hence geographical area, associated with the position and pointing direction of the electronic device so desired. If the determined rotational acceleration range is from 20°/sec to 40°/sec, the search distance is determined to be 50 meters and hence the area in white 604 would be searched for POI's.

This search would return a result of object A 1307. If the determined rotational acceleration range is from 40°/sec to 60°/sec, the search distance is determined to be 100 meters and hence the areas in white 1304 and light gray 1305 would be searched for POI's. This search would return a result of object A 1307 and object B 1308. If the determined rotational acceleration range is 60°/sec or greater, the search distance is determined to be 200 meters and hence the areas in white 1304, light gray 1305 and dark gray 1306 would be searched for POI's. This search would return a result of objects A 1307, B 1308, C 1309 and D 1310. In some implementations, the search distance is adjusted based on the population or POI density of the geographic location. For example, if the geographic location 1301 is below a threshold that is indicative of low POI or population density, the search distance may be multiplied by constant (e.g. 2).

It should be noted that object E 1311 may not returned as a search result in any instance since its distance from the location of the electronic device 1301 is beyond the largest search distance in this example. It should also be noted that the system may simply cache all the POI's in the largest of the triangles shown, i.e., the triangle encompassing areas 1304, 1305, and 1306, and then filter the results to be displayed by range. Alternatively, the system may do individual searches for different sized triangles, i.e., the triangle encompassing area 1304, the triangle encompassing areas 1304 & 1305, etc. as defined by the search distance and hence by the rotational acceleration of the electronic device.

In an additional example of the system in operation, suppose a user who is visiting Portland, Oreg. for a vacation. They find themselves out and about, just walking and discovering the town with no real plans or agenda. As they walk they find themselves in the South East quadrant of the city walking South on SE 38th St. The street ends in a T intersection at SE Hawthorne St., a busy street with seemingly, judging by all the storefronts, marquees and bustle of people, lots to see and do in both directions, east and west. Our user would like to determine what direction would be more interesting and have the most to offer that would fit their individual tastes and current needs, movies, food, coffee, shopping etc.

In one scenario, they take their electronic device, face down SE Hawthorne St. to the east and make a cast. The user may or may not know what direction they are pointing, but as long as the electronic device can determine this with its array of sensors, it is not essential for the user to know when making a cast. Since they want to know what is in that direction for some distance on the long busy street, their casting motion is a long and quick gesture of the forearm resulting in around a 110-degree change in angle of their electronic device during the cast, quite a long cast. The system determines that this change in angle and the rate of change of the angle, the speed, during a cast will result in a search distance of one mile, this is for example only and when deployed the system can interpret each change of angle, and speed of change, in a variety of manners. This would be up to the maker of each casting system or could be set by the user.

The results that are returned from their cast to the east might include a music venue, a Mexican restaurant, a pizza restaurant, and others. They are shown what band is paying the music venue that day and user review ratings for all the restaurants that are returned from the search. The user then turns and faces west and executes a similar cast to the west.

They discover that the objects in that direction include a bookstore, a movie theater (including what is showing that day with screening times), a donut shop, a gift shop, and more. Since the options to the west are more appealing to the user, they proceed on their walk in that direction.

It should be noted that the searches initiated by the casts in each direction pulled data from multiple sources and APIs. In this example, they could have pulled data from search engine having a site with crowd sourced restaurant reviews, a service that provides movie location and time information, a band touring information website, and more. With these services, it is also possible that user bought a ticket for a movie using the movie location service, in effect, casting that results commerce and secure trusted payments.

In another example of the system in use, suppose a user is in Battery Park at the southern tip of the island of Manhattan, New York City, N.Y. They are looking Southwest towards the Statue of Liberty, located 1.75 miles from the south end of Manhattan. They want more information about the statue's history and how to get there and take a tour. Instead of typing "Statue of Liberty" into a web browser on their electronic device or opening a tour book and finding the pages relating to the Statue of Liberty, they simply cast their electronic device in the direction of the Statue of Liberty. Since the Statue of Liberty is quite a distance away, they make a very long cast, using their whole arm, resulting in a change of angle of 200-degrees and a search distance of 2 miles. The Statue of Liberty turns up in the search results, along with Ellis Island, and they are then linked to all the information they needed about the Statue of Liberty and how to visit it.

There may also be use cases where one would like to make a cast where the direction and width of the defined search area are defined by the compass bearing change at the start and the end of a cast. This would result in the user being able to search a wider area than normal when casting. This would most likely involve a slashing motion of the arm during the cast. Sort of a "karate chop" where the arm goes up to down and side to side in a diagonal path. For example, a user who isn't particularly concerned in the precise direction of travel or their next stop who just wants the best coffee in a general direction might use this. They make a cast with a slashing motion resulting in a compass bearing change of 90-degrees and a change of angle of their electronic device of 60-degrees. The cast direction is centered at the mid-point of the two compass readings, the start and the end of the casting motion. This results in a defined area of search 90-degrees in width and a half mile in distance. All the coffee shops in the defined area of search are shown to the user and they can make their choice based on crowd sourced reviews or other information, or perhaps a preferred brand shows up.

Figure 12:
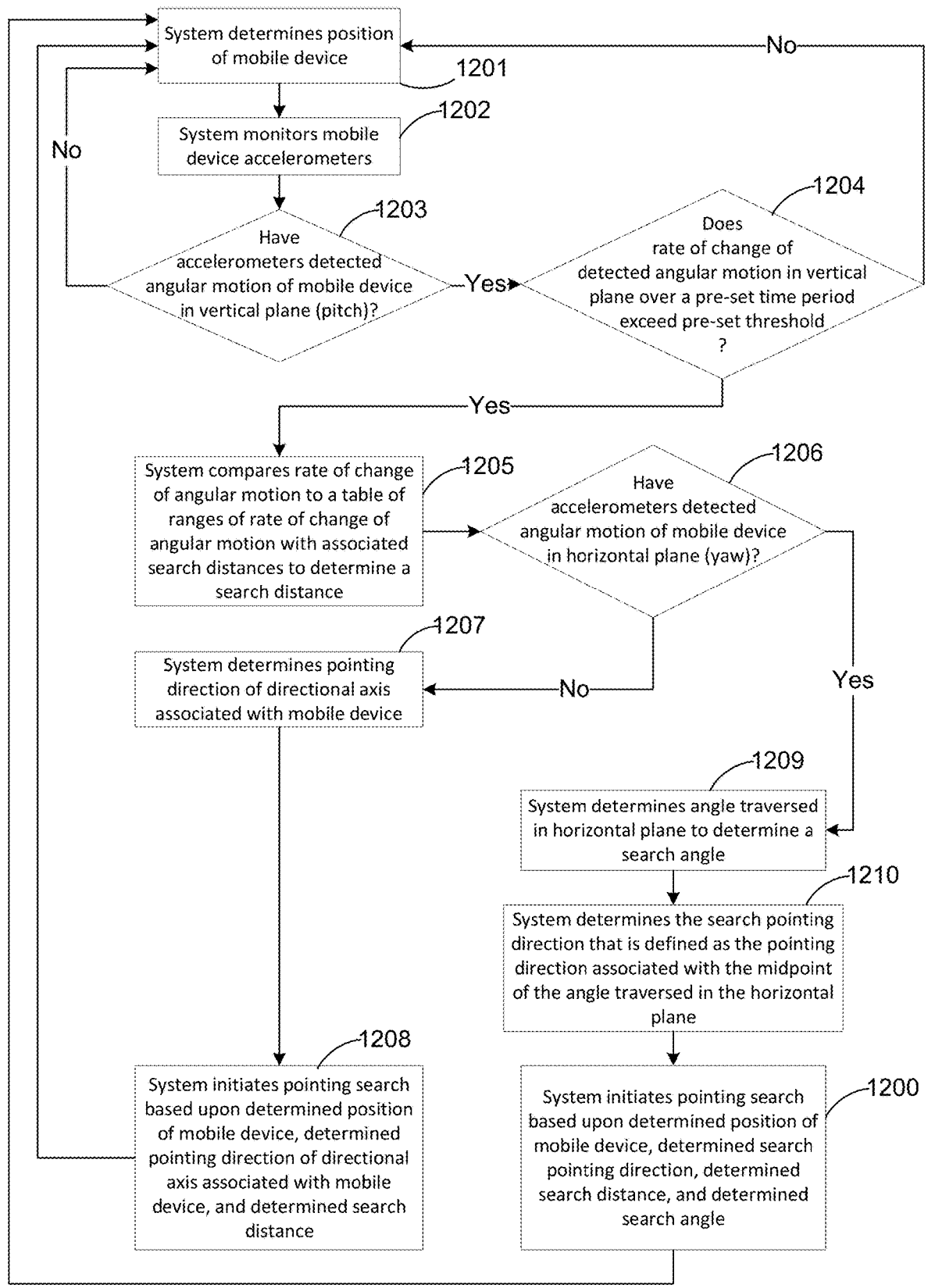
FIG. 12 is a flowchart illustrating a possible mode of operation of the "casting" system.

FIG. 12 is a flowchart 1200 illustrating a mode of operation of the "casting" system in which the angular motion of an electronic device in two axes is the trigger to initiate a pointing search. In step 1201, the system determines the location of the electronic device. The flow then branches to step 1202. In step 1202, the system monitors motions sensors (e.g., accelerometers, gyroscope) associated with the electronic device. The flow then branches to step 1203. In step 1203, the system determines if motion of the electronic device in the vertical plane (pitch) has been detected. If motion in the vertical plane has not been detected, the flow branches back to step 1201. If motion in the vertical plane has been detected, the flow branches to step 1204. In step 1204, the system may determine whether the rate of change or change of angular motion in the vertical plane over a pre-set time period exceeds a pre-set threshold.

If the rate of change or change of motion in the vertical plane over a pre-set time period does not exceed a pre-set threshold, the flow branches back to step 1201. If the rate of change of motion or change in the vertical plane over a pre-set time period does exceed a pre-set threshold, the flow branches to step 1205. In step 1205, the system compares the detected rate of change of motion in the vertical plane to a table of ranges of rates of motion with associated search distances and recalls the search distance associated with the detected rate of change of motion in the vertical plane. The flow then branches to step 1206. In step 1206, the system determines if motion of the electronic device in the horizontal plane (yaw) has been detected. If motion of the electronic device in the horizontal plane has not been detected, the flow branches to step 1207. If motion of the electronic device in the horizontal plane has been detected, the flow branches to step 1209.

In step 1207, the system determines the pointing direction of the directional axis associated with the electronic device. The flow then branches to step 1208. In step 1208, the system initiates a pointing search based upon the determined position and pointing direction of the electronic device and the determined search distance. In step 1209, the system determines the angle traversed in the horizontal pane to determine a search angle. The flow then branches to step 1210. In step 1210, the system determines the search pointing direction by determining the direction indicated by the midpoint of the search angle as it relates to the pointing direction of the directional axis of the electronic device. The flow then branches to step 1211. In step 1211, the system initiates a pointing search based upon the determined position and pointing direction of the electronic device, the determined search distance, and the determined search angle.

As alluded to in the previous example, a user may wish to make a casting search for a specific type of POI or service and this would be inputted into the system before a cast is made. This may be inputted by selecting from a list, Restaurants, Bars, Coffee, Tourist Attractions, ATMs, Gas, etc., inputted by the user via a electronic device's keyboard or touch screen keyboard, via voice command or other input method.

Another novel use for a cast may not to be for performing a search for POIs, but for inquiring to vendors and service providers in a defined area about certain objects the user wished to purchase or services they would like to receive. This would in effect cast a shopping list and profile (e.g., their clothing and shoe sizes, preferred colors, dietary restrictions, etc.) into a defined area. Once the requested list of objects and services was cast, the vendors in the defined area of the cast would be able to communicate with the user about objects and services they had available that met the user's needs. A system for this type of interaction between customer and vendor is taught in U.S. Pat. No. 8,527,357 (Client and server system for coordinating messaging between motivated buyers and listed sellers, issued: Sep. 3, 2013) and once a user had made their requests via a cast, a system could coordinate between the motivated buyer and the motivated seller. For example, suppose a user is out for a day of shopping and other activities in Beverly Hills, Calif. They park at the west end of Wilshire Boulevard and when they exit their car, they cast their shopping list, desired services and profile to the east, down Wilshire Boulevard. Their list of items and desired services includes blue jeans, casual pumps, an evening gown, a French manicure and lunch. All of the vendors and service providers in the defined area, as defined by her cast, are informed of her wishes and may begin interacting with her via the buyer and seller system as described in the aforementioned patent. She may be sent photos of desired items via the system and also their cost and location of the vendor via the system. She then may walk down the street and visit only the vendors and service providers who are relevant to her needs and desires as laid out by the list she had previously cast.

It should also be appreciated that while the directional searches illustrated above are shown in two dimensions such searches may also be three dimensional, i.e., the pointing direction of the electronic device may be determined in all three degrees of freedom (X, Y, & Z), and include elevation. At the moment the cast is detected to have stopped, the pointing direction of the directional axis may be determined and a pointing search may be initiated based upon that three-dimensional pointing direction from the determined position of the electronic device.

It should also be noted the "casting" and "geographical search" systems described above are two independent and yet complementary concepts, i.e., that a "Cast" may initiate any geographical search based upon the position and pointing direction of a electronic device and a geographical search of the type described is but one unique example of a search driven by the physical characteristics of a electronic device, and that a geographical search of the type described need not be, but of course could be, initiated by a "Casting" type gesture.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the inventions have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    detecting a mobile computing device oriented toward a point-of-transaction location;
    detecting a gesture made with the mobile computing device directed at the point-of-transaction location;
    determining a geographic location of the mobile computing device;
    communicating with a remote database to identify possible transactions in the remote database that are associated with the point-of-transaction location based on the geographic location of the mobile computing device adjusted for a pre-determined geographical offset according to a search with a geographical search area independent of an orientation of the mobile computing device, wherein the geographical search area is based, at least in part, on the gesture and thereby the search is based, at least in part, on the gesture;
    retrieving transaction details of the possible transactions independent of the orientation of the mobile computing device;
    filtering retrieved transaction details based on the orientation of the mobile computing device without adjusting for the pre-determined geographical offset to determine a filtered set of transactions;
    presenting at least one presented transaction of the filtered set of transactions on a display; and
    receiving input related to the at least one presented transaction.

2. The method of claim 1, wherein the gesture is a shaking or rotation of the mobile computing device.

3. The method of claim 1, further comprising presenting an interface for presenting user options and receiving a selection of an option from a user.

4. A portable device, having thereon a processor for executing instructions comprising program code to at least:
   detect a gesture performed using the portable device;
   identify a triangle, wherein the triangle is defined, at least in part, by a current geographic location of the portable device, a current compass orientation of the portable device, and a distance;
   initiate a search, at least in part by providing a search query comprising a search string, a search target geographic location adjusted for a pre-determined geographical offset from the current geographic location of the portable device, and a geographical search area about the search target geographic location, wherein the geographical search area is determined based, at least in part, on the gesture and thereby the search is based, at least in part, on the gesture;
   obtain a plurality of results for the search, wherein individual results of the plurality of results relate to the search string and are returned based on the individual results of the plurality of results having associated geographic locations within the geographical search area around the search target geographic location; and
   filter the plurality of results to remove the results that have associated geographic locations within the area but outside of the triangle.

5. The portable device of claim 4, wherein the distance of the triangle is defined according to a movement experienced by the portable device.

6. The portable device of claim 5, wherein the movement experienced is an acceleration in a sweeping motion, such that faster sweeping corresponds to larger distance.

7. The portable device of claim 6, wherein the movement is a casting-type movement.

8. The portable device of claim 4, wherein triggering of the search is defined according to a movement experienced by the portable device.

9. The portable device of claim 8, wherein triggering of the search and the movement used to define the distance is the same movement.

10. The portable device of claim 9, wherein the movement is a casting-type movement.

11. The portable device of claim 4, wherein the triangle is an isosceles triangle having a base angle and two equal angles, a base vertex, a base side opposite the base angle and two legs opposite the equal angles, with a base vertex location being a function of a current geographic location of the portable device and a direction from the base vertex to the base side is determined from a current compass orientation of the portable device.

12. The portable device of claim 11, wherein the base vertex location is a predetermined distance in a direction opposite the current compass orientation.

13. The portable device of claim 12, wherein the predetermined distance varies based at least in part on at least one of a determined density of search results or a population at a current geographic location of the portable device.

14. The portable device of claim 11, wherein a distance from the base vertex to the base side is determined from a magnitude of a movement experienced by the portable device.

15. The portable device of claim 4, wherein the triangle is further defined at least in part by a scale, wherein the scale is defined according to a magnitude of a movement experienced by the portable device.

16. A non-transitory computer-readable storage medium comprising executable instructions that, when executed by one or more processors of a computer system, cause the computer system to at least:
   monitor an amount of angular motion of an electronic device for a movement of the electronic device;
   determine that the amount of angular motion exceeds a threshold;
   determine a pointing direction of the electronic device for the movement;
   determine a geographic location of the electronic device for the movement;
   determine a gesture made using the electronic device;
   initiate a search with a search engine with a query that corresponds to a search term and a geographic search area adjusted for a pre-determined geographical offset from the current geographic location of the electronic device with the geographic search area independent of an orientation of the mobile computing device, wherein the geographic search area is determined based, at least in part, on the gesture and thereby the search is based, at least in part, on the gesture;
   filtering retrieved transaction details based on the orientation of the mobile computing device to determine a filtered set of transactions; and
   determine information indicative of a geographic region that corresponds to the movement of the electronic device, wherein the information indicative of the geographic region is defined at least in part by the pointing direction and the geographic location and filtered from the retrieved transaction details based on the orientation of the mobile computing device not adjusted for the pre-determined geographical offset.

17. The non-transitory computer-readable storage medium of claim 16, wherein the executable instructions, when executed by the one or more processors of the computer system further cause the computer system to at least:
   cause the information indicative of the geographic region to be sent to a remote server;
   obtain a plurality of results; and
   cause the plurality of results to be presented by the electronic device.

18. The non-transitory computer-readable storage medium of claim 16, wherein the information indicative of the geographic region is further determined based at least in part by a rate of angular motion in a vertical plane of the movement.

19. The non-transitory computer-readable storage medium of claim 16, wherein the pointing direction of the electronic device for the movement is determined based at least in part on:
   a first compass bearing value of the electronic device at a first position in the horizontal plane of the movement; and
   a second compass bearing value of the electronic device at a second position in the horizontal plane of the movement.

20. The non-transitory computer-readable storage medium of claim 16, wherein the dimensions of the geographic region are determined based at least in part on:
   the amount of angular motion;
   a first compass bearing value of the electronic device at a first position in the horizontal plane of the movement; and a second compass bearing value of the electronic device at a second position in the horizontal plane of the movement.

\* \* \* \* \*